US009363578B2

(12) United States Patent
Fukui et al.

(10) Patent No.: US 9,363,578 B2
(45) Date of Patent: Jun. 7, 2016

(54) COMMUNICATION SYSTEM, COMMUNICATION DEVICE, COMMUNICATION METHOD, AND COMPUTER PROGRAM

(75) Inventors: Toshiharu Fukui, Kanagawa (JP); Teruhiko Kori, Kanagawa (JP); Takehiko Nakano, Kanagawa (JP); Atsuko Ogasawara, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 57 days.

(21) Appl. No.: 13/393,467

(22) PCT Filed: Jul. 1, 2010

(86) PCT No.: PCT/JP2010/061234
§ 371 (c)(1),
(2), (4) Date: Feb. 29, 2012

(87) PCT Pub. No.: WO2011/030605
PCT Pub. Date: Mar. 17, 2011

(65) Prior Publication Data
US 2012/0159575 A1   Jun. 21, 2012

(30) Foreign Application Priority Data
Sep. 9, 2009   (JP) .................. 2009-208688

(51) Int. Cl.
*G06F 21/44* (2013.01)
*H04N 21/835* (2011.01)
(Continued)

(52) U.S. Cl.
CPC ........... *H04N 21/835* (2013.01); *G06F 21/445* (2013.01); *H04L 9/0844* (2013.01);
(Continued)

(58) Field of Classification Search
CPC ............ H04L 63/0869; H04L 12/2657; G06F 21/445
USPC ............................................................. 726/3
See application file for complete search history.

(56) References Cited

U.S. PATENT DOCUMENTS

2002/0141737 A1*  10/2002  Fuchigami ............... 386/98
2004/0027393 A1*   2/2004  Kato et al. ................ 345/838
(Continued)

FOREIGN PATENT DOCUMENTS

CN    1671100 A    9/2005
CN    1674509 A    9/2005
(Continued)

OTHER PUBLICATIONS

Elkeelany et al., "Performance Analysis of IPSec Protocol: Encryption and Authentication", 2002, IEEE, pp. 1164-1168.*
(Continued)

*Primary Examiner* — Taghi Arani
*Assistant Examiner* — Thaddeus Plecha
(74) *Attorney, Agent, or Firm* — Oblon, McClelland, Maier & Neustadt, L.L.P

(57) ABSTRACT

To securely transmit content through remote access via an external network, such as a WAN, while exceeding restrictions of an RTT and a TTL.
A way of handling a flag for controlling remote access of content is explicitly defined, and an authentication method is explicitly defined when a content using device performs remote access. Thus, also in remote access, similarly to access of the related art in a household, a copyright protection environment of content based on the DTCP-IP is constructed.

28 Claims, 14 Drawing Sheets

(51) Int. Cl.
- *H04L 9/08* (2006.01)
- *H04L 9/32* (2006.01)
- *H04L 29/06* (2006.01)
- *H04N 21/2343* (2011.01)
- *H04N 21/438* (2011.01)
- *H04N 21/6405* (2011.01)
- *H04N 21/6408* (2011.01)

(52) U.S. Cl.
CPC .......... *H04L9/3273* (2013.01); *H04L 63/0869* (2013.01); *H04L 63/10* (2013.01); *H04N 21/234363* (2013.01); *H04N 21/4384* (2013.01); *H04N 21/6405* (2013.01); *H04N 21/6408* (2013.01); *H04L 2209/601* (2013.01); *H04L 2463/101* (2013.01)

(56) References Cited

U.S. PATENT DOCUMENTS

| | | | |
|---|---|---|---|
| 2004/0148408 A1* | 7/2004 | Nadarajah | 709/229 |
| 2004/0158634 A1 | 8/2004 | Saito et al. | |
| 2005/0027984 A1* | 2/2005 | Saito | G06F 21/10 713/168 |
| 2005/0210290 A1* | 9/2005 | Ono et al. | 713/201 |
| 2005/0259824 A1 | 11/2005 | Isozaki et al. | |
| 2006/0209089 A1* | 9/2006 | Date | 345/632 |
| 2007/0198435 A1* | 8/2007 | Siegal et al. | 705/67 |
| 2007/0250604 A1* | 10/2007 | Wu et al. | 709/220 |
| 2008/0072046 A1* | 3/2008 | Ayaki et al. | 713/171 |
| 2008/0082813 A1* | 4/2008 | Chow et al. | 713/2 |
| 2008/0092080 A1* | 4/2008 | Ichikawa et al. | 715/838 |
| 2008/0243466 A1* | 10/2008 | Brunet et al. | 703/23 |
| 2008/0280677 A1* | 11/2008 | Cooper | 463/29 |
| 2009/0007198 A1* | 1/2009 | Lavender et al. | 725/91 |
| 2009/0217037 A1* | 8/2009 | Courtay | H04L 9/3271 713/168 |
| 2016/0004846 A1* | 1/2016 | Nakano | H04L 63/108 726/27 |

FOREIGN PATENT DOCUMENTS

| | | |
|---|---|---|
| JP | 2004-180020 | 6/2004 |
| JP | 2004-180029 | 6/2004 |
| JP | 2004-295337 | 10/2004 |
| JP | 2005-204094 | 7/2005 |
| JP | 2005-269288 | 9/2005 |
| JP | 2005-275828 | 10/2005 |
| JP | 2006-5909 | 1/2006 |
| JP | 2006-025259 | 1/2006 |
| JP | 2006-323707 | 11/2006 |
| JP | 2007-036351 | 2/2007 |
| JP | 2007-323617 | 12/2007 |
| JP | 2008-205887 | 9/2008 |
| JP | 2009-225074 | 10/2009 |
| JP | 2010-268174 | 11/2010 |
| JP | 2010-286864 | 12/2010 |
| WO | WO 2010/035490 A1 | 4/2010 |

OTHER PUBLICATIONS

Liu et al., "A Secured Video Streaming System", 2010, pp. 625-630.*
Extended European search report from the European Patent Office in EP 10 81 5203 from Munich, mailed Mar. 4, 2013.
Office Action issued by Japan Patent Office on Nov. 5, 2013 in corresponding Application No. JP 2009-208688 (7 pages).
Communication Pursuant to Article 94(3) EPC dated Jan. 7, 2014 (6 pages).
Office Action issued by the Patent office of the People's Republic of China on Mar. 24, 2014 in corresponding Application No. CN 2010-80048621.7 (19 pages).
Office Action issued by the Japan Patent Office on Apr. 30, 2014 in corresponding Application No. JP 2009-208688 (6 pages).
Digital Transmission Content Protection Specification, vol. 1 (Informational Version), Oct. 1, 2007, Revision 1.51 (82 pages).
European Patent Office Munich Germany; Summons to Attend Oral Proceedings Rule 115(I): Jun. 13, 2014.
Office Action issued Sep. 1, 2015 in Japanese Patent Application No. 2014-128647.
DTCP vol. 1 Supplement G Mapping DTCP to Wireless HD (Informational Version),DTCP vol. 1 Supplement G Revision 1.0 (Information Version), Jul. 11, 2008, 17 pages.
Office Action issued on Apr. 5, 2016 in Japanese Application No. 2014-128647.

* cited by examiner

|  | msb |  |  |  |  |  |  | lsb |
|---|---|---|---|---|---|---|---|---|
| Type[0] | 0 | 0 | 0 | 0 | 0 | 0 | 0 | 1 |
| Length[0] | (msb) | Byte Length of Control and AKE_Info Fields (N+8) | | | | | | (lsb) |
| Length[1] | | | | | | | | |
| Control[0] | reserved (zero) | | | | ctype/response | | | |
| Control[1] | Category = $0000_2$ (AKE) | | | | AKE_ID = $0000_2$ | | | |
| Control[2] | subfunction | | | | | | | |
| Control[3] | AKE_procedure | | | | | | | |
| Control[4] | exchange_key | | | | | | | |
| Control[5] | subfunction_dependent | | | | | | | |
| Control[6] | AKE_label | | | | | | | |
| Control[7] | number (option) | | | | status | | | |
| AKE_Info[0..N-1] | AKE_Info | | | | | | | |

FIG. 14

| DATA STRUCTURE | NUMBER OF BITS | BIT STRING REPRESENTATION |
|---|---|---|
| digital_copy_control_descriptor(){ | | |
|   descriptor_tag | 8 | uimsbf |
|   descriptor_length | 8 | uimsbf |
|   digital_recording_control_data | 2 | bslbf |
|   maximum_bitrate_flag | 1 | bslbf |
|   component_control_flag | 1 | bslbf |
|   used_defined | 4 | bslbf |
|   if (maximum_bitrate_flag == 1){ | | |
|     maximum_bitrate | 8 | uimsbf |
|   } | | |
|   if (component_control_flag == 1){ | | |
|     component_control_length | 8 | uimsbf |
|     for (i=0;i<N;N++){ | | |
|       component_tag | 8 | uimsbf |
|       digital_recording_control_data | | |
|       maximum_bitrate_flag | 1 | bslbf |
|       reserved_future_use | 1 | bslbf |
|       user_defined | 4 | bslbf |
|       if (maximum_bitrate_flag == 1){ | | |
|         maximum_bitrate | 8 | uimsbf |
|       } | | |
|     } | | |
|   } | | |
| } | | |

FIG. 16

| TS PACKET | TS PACKET (PMT) | TS PACKET | TS PACKET | TS PACKET (PMT) | TS PACKET | TS PACKET |

COMMUNICATION SYSTEM, COMMUNICATION DEVICE, COMMUNICATION METHOD, AND COMPUTER PROGRAM

TECHNICAL FIELD

The present invention relates to a communication system, a communication apparatus, a communication method, and a computer program that prevent illegal use in transmission of content. More particularly, the present invention relates to a communication system, a communication apparatus, a communication method, and a computer program that transmit encrypted content and perform exchange of a decoding key for encrypted content in accordance with a predetermined mutual authentication and key exchange (AKE) algorithm.

In particular, the present invention relates to a communication system that securely transmits content through remote access (RA) via an external network, such as a WAN, and to a communication apparatus, a communication method, and a computer program that securely transmit content through remote access while exceeding restrictions as a round trip delay time (RTT) and a hop count (TTL) of an IP router, and particularly relates to a communication system, a communication apparatus, a communication method, and a computer program.

BACKGROUND ART

It has hitherto been a fundamental fact that broadcast content and content on packaged media are used in a place where a receiving device and a reproduction device are disposed, or used in a device that is connected to these devices through a home network (hereinafter also referred to as "local access (LA)". For example, it has been difficult from a technological point of view due to a communication path, a codec, and the like that, with a portable device, connection is made to a receiving device and a reproduction device from outdoors, and content is used after undergoing transmission via an external network, such as a WAN (Wide Area Network) (hereinafter also referred to as "remote access (RA)". However, in the future, wide use of data communication technologies, such as LTE (Long Term Evolution) and WiMAX (World Interoperability for Microwave Access), and a high-compression codec of H.264 or the like is expected, and remote access can be implemented by utilizing these technologies. An example thereof is a usage in which a user accesses a server at a user's home from a place where the user is staying and reproduces content.

Additionally, digitized content is comparatively easily subjected to an illegal operation, such as copying and tampering. In particular, in remote access, a scheme for preventing illegal use involved in content transmission, that is, copyright protection, while permitting personal or home use of content, is necessary.

Examples of industry standard technologies for transmission protection of digital content include DTCP (Digital Transmission Content Protection) developed by the DTLA (Digital Transmission Licensing Administrator). In the DTCP, an authentication protocol to be used among devices at the time of content transmission, and a transmission protocol for encrypted content have been agreed upon. The regulations, in summary, are that a DTCP-compliant device does not send compressed content that is easy to handle outside of the device in a non-encrypted state, performs a key exchange that is necessary to decode encrypted content in accordance with a predetermined mutual authentication and key exchange (AKE) algorithm, and limit the range of a device that performs a key exchange in accordance with an AKE command. A server (source), which is a content providing source, and a client (sink), which is a content providing destination, share a key undergoing an authentication procedure by transmitting and receiving an AKE command, encrypt a transmission path by using the key, and perform the transmission of content. Therefore, since an unauthorized client cannot obtain an encryption key unless authentication with a server succeeds, it is not possible for the unauthorized client to enjoy content.

DTCP is primarily such that content transmission in a home network using a transmission path, such as IEEE 1394, has been defined. In recent years, as typified by the DLNA (Digital Living Network Alliance), also in a household, a trend of causing digitized AV content to be distributed through an IP network is in full swing. Accordingly, also in households, with the intent of causing digital content to be distributed through an IP network, development of a DTCP technology corresponding to an IP network, that is, DTCP-IP (DTCP mapping to IP), has been in progress.

DTCP-IP is a similar technology in that the DTCP technology is ported to an IP network, in which an IP network is used for a transmission path, and a protocol for content transmission, which is implemented in an IP network, such as an HTTP (Hyper Text Transfer Protocol) and an RTP (Real-Time Transfer Protocol), is used to transmit encrypted content. For example, in a case where content is to be transmitted in accordance with the procedure of HTTP, a source becomes an HTTP server, a sink becomes an HTTP client, a TCP/IP connection for HTTP is generated, and download transmission of encrypted content is performed (however, when upload transmission is to be performed, a source becomes an HTTP client, and a sink becomes an HTTP server).

The present DTCP-IP (DTCP Volume 1 Specification Supplement E Revision 1.2) is mainly intended to ensure use of content only in a household. For this reason, a round trip delay time (RTT) has been limited to a maximum of seven milliseconds for an AKE command, and the upper limit of the hop count (TTL: Time To Live) of an IP router has been set to three.

For example, an information communication system described below has been proposed: from when the source starts DTCP-IP authentication until immediately before it is completed, the source monitor continues to monitor each of received AKE commands, continues to update the maximum value of the TTL value, checks the maximum value of the TTL value immediately before the authentication procedure is completed, performs key exchange if the maximum value is smaller than or equal to three, and ends the authentication procedure when the maximum value exceeds three without performing processing of the final stage (refer to, for example, PTL 1).

However, if restrictions impose on RTT and TTL, it is not possible to access content whose copyright is protected, which exists in a server of a home network in a household, from a distant place outside the household.

When the convenience of a user is considered, it is desired to permit remote access to content, but it is contradictory to the profit of the content owner desiring copyright protection.

CITATION LIST

Patent Literature

Patent Document 1: Japanese Unexamined Patent Application Publication No. 2007-36351

DISCLOSURE OF INVENTION

Technical Problem

An object of the present invention is to provide a superior communication system, a superior communication apparatus, a superior communication method, and a superior computer program that exchange a decoding key for encrypted content in accordance with a predetermined mutual authentication and key exchange (AKE) algorithm and that can suitably prevent illegal use in the transmission of content.

Additional object of the present invention is to provide a superior communication system, a superior communication apparatus, a superior communication method, and a superior computer program that securely transmit content through remote access (RA) via an external network, such as a WAN, while exceeding restrictions such as the round trip delay time (RTT) and the hop count (TTL) of an IP router.

Solution to Problem

The present application has been achieved by considering the above-described problems. An invention according to Claim 1 is a communication system that performs communication for transmitting content between a content providing device that provides content and one or more content using devices that use the content, the communication system including:

authentication means for authenticating a content using device that performs remote access in accordance with a mutual authentication procedure for remote access, in which a restriction on a round trip delay time of a command is not imposed;

identification means for identifying whether or not the content requested through remote access from the content using device has been allowed for remote access; and transmission means for transmitting the requested content to the authenticated content using device from the content providing device in response to an identification result obtained by the identification means and an authentication result obtained by the authentication means.

Note that the "system" referred to herein refers to a logical assembly of a plurality of devices (or function modules which realize specific functions), and it does not particularly matter whether or not each device or each function module is within a single housing.

An invention according to Claim 2 of the present application is a communication apparatus including authentication means for authenticating a content using device that performs remote access in accordance with a mutual authentication procedure for remote access, in which a restriction on a round trip delay time of a command is not imposed;

identification means for identifying whether or not the content requested through remote access from the content using device has been allowed for remote access; and providing means for providing the requested content to the content using device, wherein the providing means provides content to the content using device that requests content through remote access in response to an identification result obtained by the identification means and an authentication result obtained by the authentication means.

According to an invention as set forth in Claim 3 of the present application, the authentication means of the communication apparatus according to Claim 2 is configured so as not to impose a restriction on a hop count of an IP router at the time of a mutual authentication procedure for remote access.

According to an invention as set forth in Claim 4 of the present application, the identification means of the communication apparatus according to Claim 2 is configured so as to identify whether or not remote access has been allowed on the basis of information indicating allowance/disallowance of remote access, the information being superimposed in a predetermined control descriptor of the requested content.

According to an invention as set forth in Claim 5 of the present application, the identification means of the communication apparatus according to Claim 2 is configured so as to identify whether or not remote access has been allowed on the basis of the described content of the predetermined control descriptor of the requested content.

According to an invention as set forth in Claim 6 of the present application, the identification means of the communication apparatus according to Claim 2 is configured so as to identify whether or not remote access has been allowed on the basis of the described content of copy control information contained in the predetermined control descriptor of the requested content.

According to an invention as set forth in Claim 7 of the present application, the communication apparatus according to Claim 2 further includes a storage unit that can store content, wherein the identification means is configured so as to identify that the content that has been copied in the storage unit has been allowed for remote access.

According to an invention as set forth in Claim 8 of the present application, the communication apparatus according to Claim 2 further includes a receiving unit that receives broadcast content, wherein the identification means identifies whether or not real time content that is being broadcast has been allowed for remote access on the basis of an elapsed time after the completion of the broadcast.

According to an invention as set forth in Claim 9 of the present application, the communication apparatus according to Claim 2 further includes a receiving unit that receives broadcast content, and a storage unit that can store content, wherein after the identification means temporarily stores the received broadcast content in the storage unit, the identification means is configured so as to identify that the content has been allowed for remote access.

According to an invention as set forth in Claim 10 of the present application, the communication apparatus according to Claim 2 further includes a storage unit having a first area for storing remote access allowed content and a second area for storing remote-access disallowed content, wherein content items are sorted into the first or second area on the basis of an identification result obtained by the identification means and are stored in the storage unit.

According to an invention as set forth in Claim 11 of the present application, the communication apparatus according to Claim 2 further includes registration means for registering in advance a content using device after undergoing a mutual authentication procedure for registration in which a restriction on a round trip delay time of a command is imposed, wherein the authentication means is configured so as to perform an authentication procedure only when the content using device that performs remote access has been registered by the registration means.

According to an invention as set forth in Claim 12 of the present application, the registration means of the communication apparatus according to Claim 11 is configured so as to impose a restriction on a hop count of an IP router at the time of the mutual authentication procedure for registration.

According to an invention as set forth in Claim 13 of the present application, the registration means of the communication apparatus according to Claim 11 is configured so as to pre-register a content using device, the registration means registers a user ID, a pass phrase or key, bio-information of a user, or other authentication information for remote access in combination, and when the authentication means authenticates a content using device that performs remote access, the authentication means performs an authentication process using the pre-registered authentication information in combination.

According to an invention as set forth in Claim 14 of the present application, the authentication means of the communication apparatus according to Claim 13 is configured so as to perform an authentication process using the pre-registered authentication information through a portable medium on which the authentication information for remote access has been written.

According to an invention as set forth in Claim 15 of the present application, the authentication means of the communication apparatus according to Claim 11 is configured so as to authenticate a content using device that performs remote access through a dongle tied to a relevant device.

According to an invention as set forth in Claim 16 of the present application, the registration means of the communication apparatus according to Claim 11 is configured so as to pre-register a content using device, the registration means registers one or more content items that are used by a relevant content using device at the time of remote access in combination, and the providing means provides only pre-registered content by assuming that the content is used at the time of the remote access to the content using device that performs remote access.

According to an invention as set forth in Claim 17 of the present application, the authentication means of the communication apparatus according to Claim 2 is configured so as to perform, instead of the mutual authentication procedure for remote access, a procedure of authenticating the content using device that performs remote access through a log-in process for a predetermined authentication server.

According to an invention as set forth in Claim 18 of the present application, the authentication means of the communication apparatus according to Claim 2 is configured so as to authenticate a content using device that performs remote access on the basis of an information bit indicating allowance/disallowance of remote access, the information bit being provided in a mutual authentication control command from the content using device.

According to an invention as set forth in Claim 19 of the present application, the authentication means of the communication apparatus according to Claim 2 is configured so as to authenticate a content using device that performs remote access in accordance with a mutual authentication procedure dedicated to remote access.

According to an invention as set forth in Claim 20 of the present application, the providing means of the communication apparatus according to Claim 18 or 19 is configured so as to encrypt and transmit content requested through remote access from the content using device by using an encryption mode dedicated to remote access.

According to an invention as set forth in Claim 21 of the present application, the providing means of the communication apparatus according to Claim 18 or 19 is configured so as to prohibit re-output of content through remote access.

According to an invention as set forth in Claim 22 of the present application, the communication apparatus according to Claim 18 or 19 further includes a storage unit that can store content, wherein when information indicating that remote access is allowed has been appended to content stored in the storage unit, the providing means is configured so as to prohibit re-output through remote access.

According to an invention as set forth in Claim 23 of the present application, the communication apparatus according to Claim 18 or 19 further includes a storage unit that can store content, wherein when content to which information indicating that remote access is possible has been appended is to be stored in the storage unit, the identification means is configured so as to rewrite the relevant information to remote access disallowed.

According to an invention as set forth in Claim 24 of the present application, the identification means of the communication apparatus according to Claim 18 or 19 is configured so as to, when information indicating allowance/disallowance of remote access has not been appended to the content received in accordance with a predetermined protocol, on which copyright protection has been performed, handle the relevant content as being remote access disallowed.

According to an invention as set forth in Claim 25 of the present application, the identification means of the communication apparatus according to Claim 18 or 19 is configured so as to, when information indicating allowance/disallowance of remote access has not been appended to the content received in accordance with a predetermined protocol, on which copyright protection has been performed, identify whether or not the relevant content has been allowed for remote access on the basis of copy control information that is set in the relevant content.

According to an invention as set forth in Claim 26 of the present application, the communication apparatus according to Claim 25 further includes a storage unit that can store content, wherein the identification means is configured so as to temporarily store the content that is not made to be disallowed for remote access in the storage unit and thereafter handle the content as being remote access allowed, and handle the content as being disallowed for remote access in a state before the content is stored in the storage unit.

An invention as set forth in Claim 27 of the present application is an communication method including:

an authentication step of authenticating a content using device that performs remote access in accordance with a mutual authentication procedure for remote access, in which a restriction on a round trip delay time of a command is not imposed;

an identification step of identifying whether or not the content that has been requested through remote access from the content using device has been allowed for remote access; and a providing step of providing the requested content to the content using device, wherein in the providing step, content is provided to the content using device that requests content through remote access in accordance with an identification result in the identification step and an authentication result in the authentication step.

An invention as set forth in Claim 28 of the present application is a computer program written in a computer-readable format so that a process for providing content via a network is performed in a computer, causing the computer to function as authentication means for authenticating a content using device that performs remote access in accordance with a mutual authentication procedure for remote access, in which a restriction on a round trip delay time of a command is not imposed;

identification means for identifying whether or not the content requested through remote access from the content using device has been allowed for remote access; and providing means for providing the requested content to the content using device, wherein the providing means provides content to the content using device that requests content through remote access in response to an identification result obtained by the identification means and an authentication result obtained by the authentication means.

The computer program according to Claim 28 of the present application is such that a computer program that is written in a computer-readable format so as to realize predetermined processing on a computer is defined. In other words, by installing the computer program according to Claim 28 of the present invention into a computer, coordinated operation is exhibited in the computer, and operational effects identical to those of the communication apparatus according to Claim 2 of the present invention can be obtained.

Advantageous Effects

According to the present invention, it is possible to provide a superior communication system, a superior communication apparatus, a superior communication method, and a superior computer program that can securely transmit content through remote access (RA) via an external network, such as a WAN, while exceeding restrictions such as a round trip delay time (RTT) and a hop count (TTL) of an IP router.

According to the present invention, it is possible to provide a superior communication system, a superior communication apparatus, a superior communication method, and a superior computer program that can perform remote access by a user while protecting content for only the limited range of the content that is permitted by a content owner.

According to the inventions as set forth in Claims 1, 2, and 3 of the present application, since a mutual authentication procedure getting rid of the limitations of RTT and TTL is applied to a content using device that performs remote access, remote access is possible. Furthermore, only content for which remote access is permitted is provided to a content using device that performs remote access. Consequently, it is possible to perform remote access to DLNA content whose copyright has been protected by the DTCP-IP from a distant place outside a household and securely use the content.

Furthermore, according to the inventions as set forth in Claims 4 to 10 of the present application, how to handle a flag for controlling the remote access of content is explicitly defined. Consequently, also in remote access, similarly to conventional access in a household, it is possible to construct a content copyright protection environment based on DTCP-IP.

Furthermore, according to inventions as set forth in Claims 1, 2, 3, and 11 to 17 of the present application, an authentication method (AKE procedure) for when a content using device performs remote access is explicitly defined. Consequently, also in remote access, similarly to conventional access in a household, it is possible to construct a content copyright protection environment based on DTCP-IP.

Further objects, features, and advantageous effects of the present invention will become apparent from the detailed description of embodiments of the present invention (to be described later) and drawings attached thereto.

BRIEF DESCRIPTION OF DRAWINGS

FIG. 14 illustrates the data structure of a digital copy control descriptor.

FIG. 16 illustrates a state in which a TS packet containing a PMT has been inserted in an MPEG TS stream at predetermined intervals.

BEST MODES FOR CARRYING OUT THE INVENTION

Embodiments of the present invention will be described below in detail with reference to the drawings.

A. System Configuration

The present invention relates to a communication system that securely transmits content through remote access (RA) via an external network, such as a WAN. The communication system is basically formed of a server (RA source) that provides content through remote access and a client (RA sink) that makes a request for content through remote access. In this specification, an AKE procedure performed at the time of remote access will be referred to as "RA-AKE". Embodiments of the present invention will be described below in detail with reference to the drawings.

Figure 1:
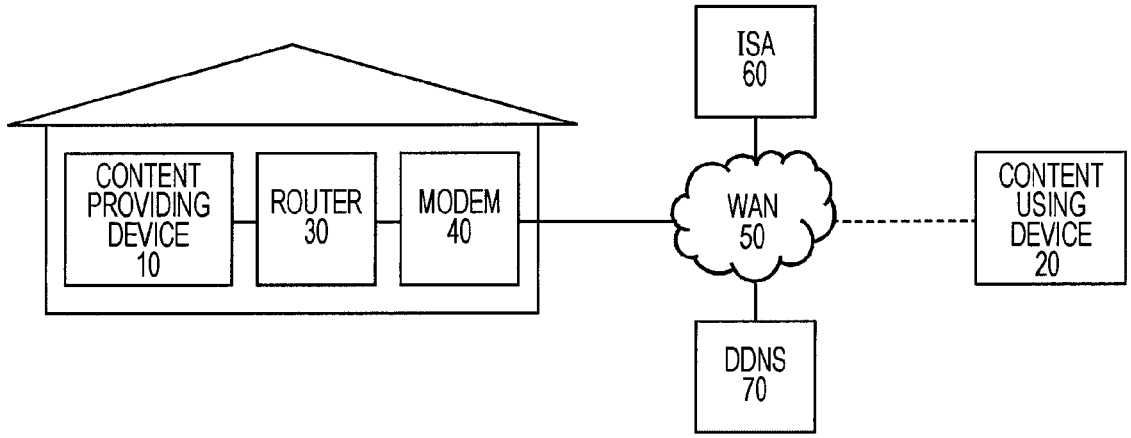
FIG. 1 is an illustration schematically showing an example of the configuration of a communication system according to the present invention.

FIG. 1 schematically shows an example of the configuration of a communication system according to the present invention. In the communication system shown in the figure, a content providing device 10 corresponding to an RA source is disposed in a household, and a content using device 20 corresponding to an RA sink is disposed outdoors. Then, the content using device 20 performs remote access to the content providing device 10 by using a communication function of a mobile phone or the like.

The content providing device 10 is generally connected to an external network, such as a WAN 50, through a router 30 and a modem 40. The WAN 50 is, for example, the Internet. An IP address on the WAN 50 side is assigned to the router 30 from an Intenet access service (IAS) provider 60 to which a user is subscribed. Furthermore, also, the content using device 20 basically accesses this IP address. The router 30 assigns a private IP address to the content providing device 10, and with regard to access from the WAN 50, the router 30 relays communication by port forwarding. Meanwhile, there is a case in which the IP address assigned to the router 30 is updated by the IAS provider 60. In such a case, handling can be done by using a DDNS service 70 and by using the DDNS (Dynamic DNS (Domain Name System)) functions of the router 30 through to the content providing device 10.

Figure 2:
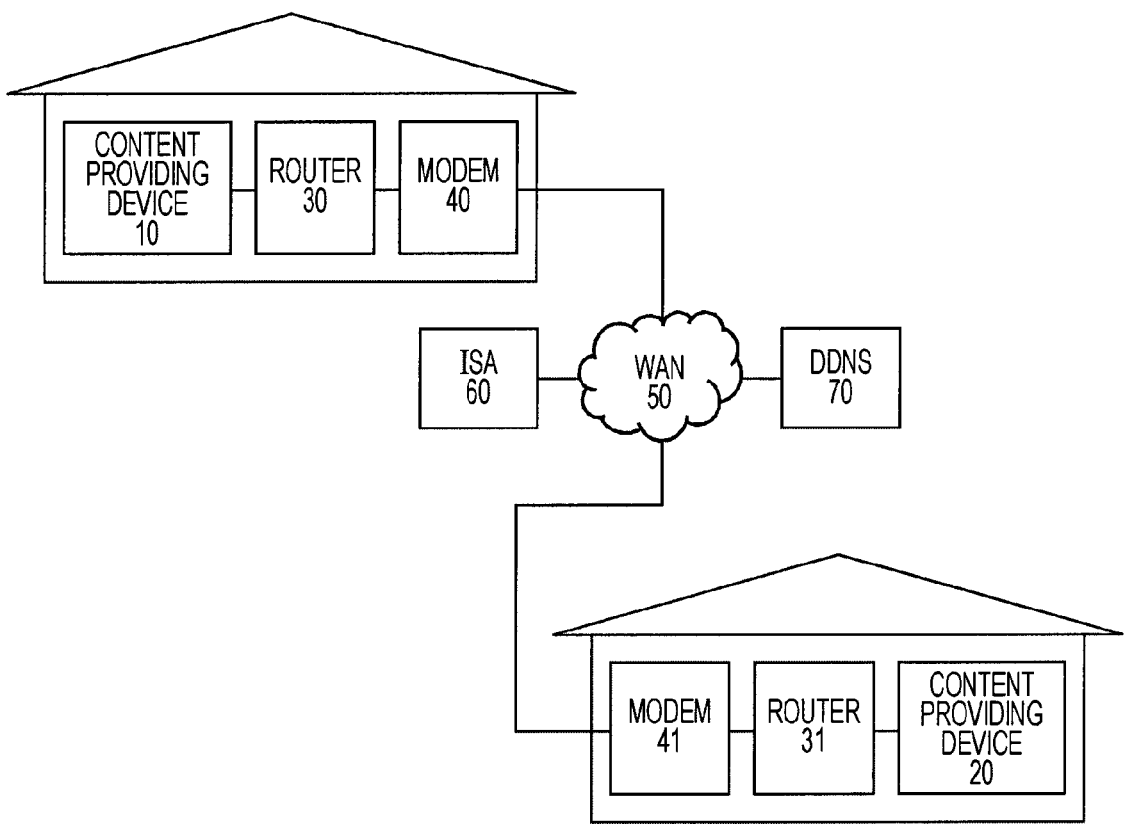
FIG. 2 is an illustration schematically showing another example of the configuration of the communication system according to the present invention.

Furthermore, FIG. 2 schematically shows another example of the configuration of the communication system according to the present invention. In the communication system shown in the figure, the content using device 20 corresponding to the RA sink is also disposed in a household, and is connected to the WAN 50 through a router 31 and a modem 41. TCP/IP (Transmission Control Protocol/Internet Protocol) communication transmitted from the content using device 20 is address-converted by the NAT (Network Address Translation) function of the router 31, and the remainder of the process is similar to the case of FIG. 1.

Figure 3:
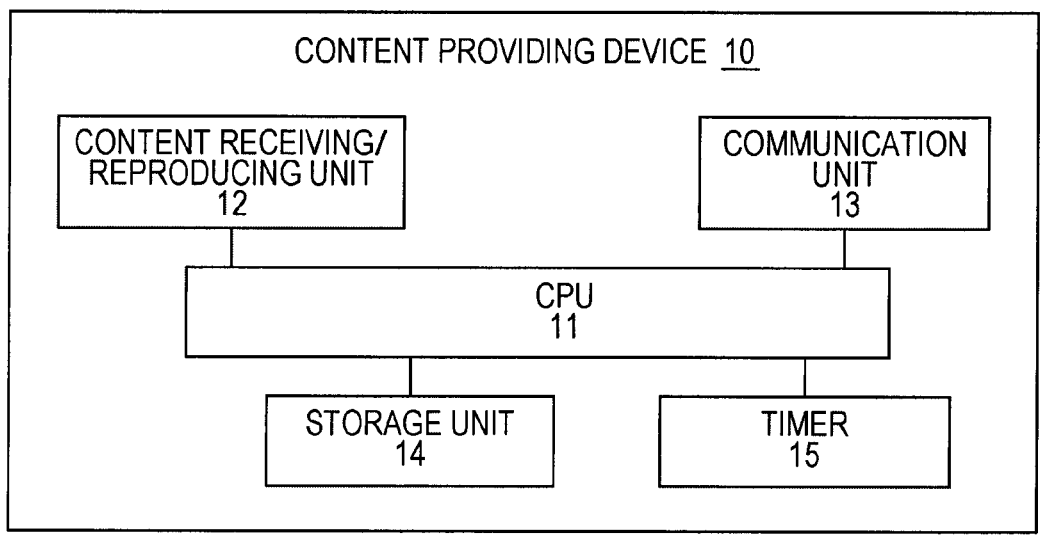
FIG. 3 is an illustration schematically showing the functional configuration of a content providing device 10.

FIG. 3 schematically shows the functional configuration of the content providing device 10. The content providing device 10, which includes a CPU (Central Processing Unit) 11, a content receiving/reproducing unit 12, a communication unit 13, a storage unit 14, and a timer 15, functions as a home network server and an RA source, and transmits content through remote access.

The content receiving/reproducing unit 12 includes a broadcast reception function and a package medium reproduction function. The CPU 11 applies appropriate protection to the content obtained by the content receiving/reproducing unit 12 for which remote access is possible, and thereafter transmits the content to the RA sink (content using device 20) with which the mutual authentication and key exchange have been performed using an RA-AKE through the communication unit 13.

In the storage unit 14, the identification information (Device ID) and the authentication information (user ID for remote access, a pass phrase or key, or the bio-information of the user, etc.) of the RA sink, which are stored by a registration process (to be described later), an exchange key shared with the RA sink through the RA-AKE, the identification information thereof, and the like are stored. Furthermore, the storage unit 14 can also be used in an application of storing content obtained by the content receiving/reproducing unit 12.

The timer 15 is used in a case where time management becomes necessary when remote-accessible content is to be handled.

Figure 4:
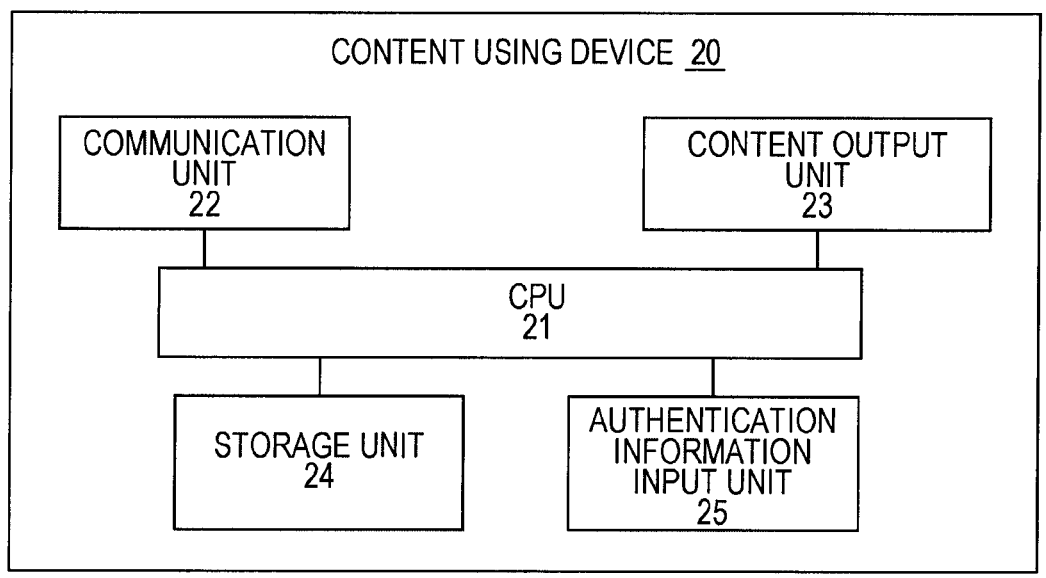
FIG. 4 is an illustration schematically showing the functional configuration of a content using device 20.

FIG. 4 schematically shows the functional configuration of the content using device 20. The content using device 20, which includes a CPU 21, a communication unit 22, a content output unit 23, a storage unit 24, and an authentication information input unit 25, functions as an RA sink so as to receive content through remote access.

The content using device 20 serving as an RA sink performs a device registration process (to be described later) on the RA source (content providing device 10) through the communication unit 22. In addition, the content using device 20 performs RA-AKE, obtains an exchange key from the RA source, stores the exchange key in the storage unit 24, and also decodes the encrypted content obtained from the RA source by using an encryption key calculated on the basis of the key, and outputs content from the content output unit 23. The storage unit 24 is used to store the exchange key and the content that are received from the RA source.

The authentication information input unit 25 includes an input operation unit through which a user inputs a passphrase or a key, a bio-information reading unit for obtaining the bio-information of the user, a medium loading unit to which a portable medium having a passphrase or a key recorded thereon is loaded, and a dongle loading unit to which a hardware key, such as a dongle, which is tied to a home network server, is loaded.

It is assumed in the following description that a method of calculating an encryption key on the basis of an exchange key complies with DTCP-IP (however, the gist of the present invention is not necessarily limited to this method).

Figure 5:
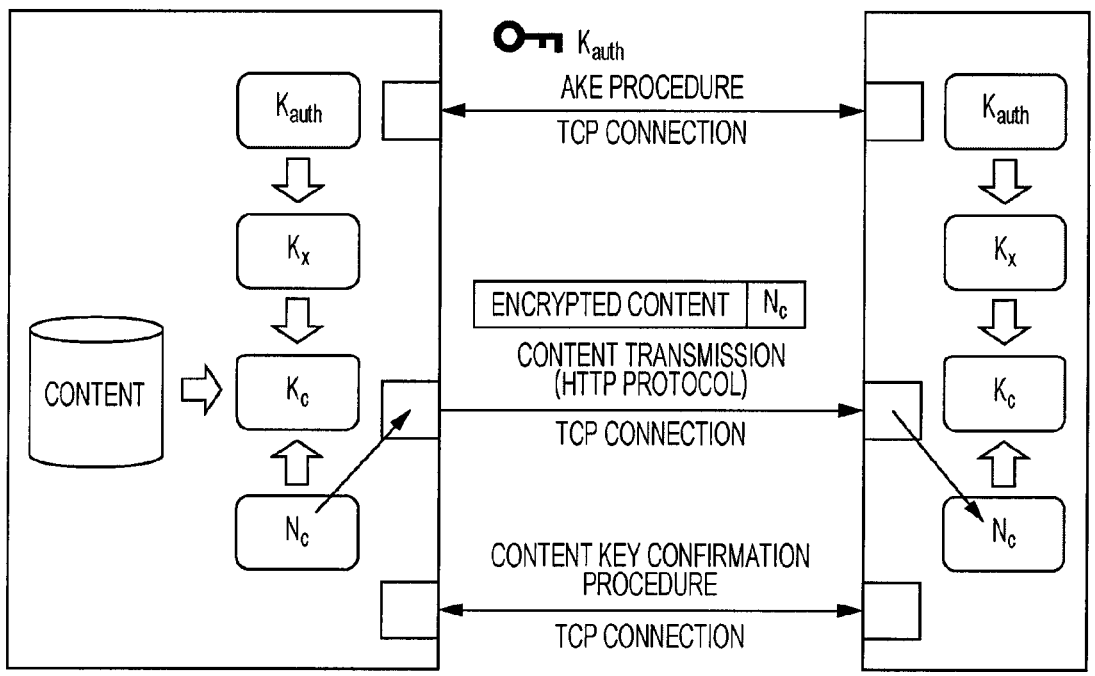
FIG. 5 illustrates a scheme for performing encrypted content transmission using DTCP-IP between a source and a sink.

Here, a description will be given, with reference to FIG. 5, of a scheme in which encrypted content transmission is to be performed in accordance with DTCP-IP between the source and the sink. The forms of content transmission include a method of copying content in the source to the sink, and a method of moving content from the source to the sink and not leaving the content (well known). In FIG. 5, a description will be given on the assumption of the former content transmission method using copy.

First, the source and the sink establish one TCP/IP connection, and perform an authentication (AKE procedure) between the devices. In a DTCP-compliant device, a device certificate issued in accordance with DTLA (above-mentioned) has been embedded. In the AKE procedure, after it is confirmed that they are authorized DTCP-compliant devices, an authentication key $K_{auth}$ can be shared between the source and the sink.

When the AKE procedure succeeds, the source generates an exchange key $K_x$ that is a seed for a content key $K_c$, encrypts the exchange key $K_x$ using the authentication key $K_{auth}$, and sends it to the sink. By applying a predetermined computation operation process on the exchange key $K_x$ in each of the source and the sink, it is possible to generate a content key $K_c$ that is used to encrypt content at the time of content transmission.

Then, after the authentication key exchange procedure in accordance with AKE is completed between the DTCP-compliant devices, content transmission starts using the protocol of HTTP, RTP, or the like. In the example shown in the figure, content transmission is performed in accordance with the procedure of HTTP. At that time, apart from the TCP/IP connection for the AKE procedure, a TCP/IP connection for HTTP is generated (that is, the source and the sink each have individual socket information (combination of an IP address and a port number) for the AKE procedure and for content transmission.

In order to perform content transmission in accordance with an HTTP protocol, two types are given: a download format in which the sink requests the source for content, and an upload format in which content is pushed from the source side to the sink. In the case of the former, the sink serving as an HTTP client requests the source serving as an HTTP server for content in accordance with, for example, an HTTP request using an HTTP GET method. In response, content in compliance with the request is transmitted as an HTTP response from the source. Furthermore, in the case of the latter, the source serving as an HTTP client starts transmission with the sink serving as an HTTP server in accordance with an HTTP request using, for example, an HTTP POST method.

The data transmitted from the source is formed as data such that content is encrypted using the key shared after the source has performed the AKE authentication. Specifically, the source generates a nonce $N_c$ by using a random number, and generates a content key $K_c$ corresponding to the exchange key $K_x$, the nonce $N_c$, and the encryption mode. Then, the source encrypts the content requested from the sink by using the content key $K_c$, and transmits a packet formed by a payload formed of the encrypted content, and a header containing the information on the nonce $N_c$ and the encryption mode in such a manner as to be carried on a TCP stream. In the IP protocol, the TCP stream is divided at a packet size, which is a predetermined unit, further forms it as an IP packet to which the header part is appended, and sends it to a specified IP address destination.

When the sink side receives each IP packet from the source, the sink side assembles this IP packet into a TCP stream. Then, when the sink side extracts the nonce $N_c$ and E-EMI, the sink side calculates a content key $K_c$ by using these and the exchange key $K_x$, and thus can decode the encrypted content. Then, it is possible to perform a reproduction process on the content of the plain text after being decoded. Alternatively, the sink stores the content in the storage unit 24 or passes the content through to another device without decoding the encrypted content. When the content transmission using the HTTP protocol in the manner described above is completed, for example, the TCP connection used for the content transmission is disconnected as appropriate from the sink side. (In the DTCP-IP, transmission of copy control information associated with content is realized by two mechanisms of E-EMI (Extended Encryption Mode Indicator) and Embedded CCI (Copy Control Information), which are written in the header part of the packet).

Meanwhile, it is regulated in the DTCP-IP that the exchange key $K_x$ is updated periodically (for example, every two hours). If the sink cannot obtain the most recent exchange key $K_x$ from the source, the sink cannot use encrypted content. Furthermore, a method in which the source generates a single exchange key $K_x$ and delivers it to a plurality of (valid) sinks, and a method in which a different exchange key $K_x$ is generated for each sink are considered. It is assumed in the following description that the method of the former is adopted.

Figure 6:
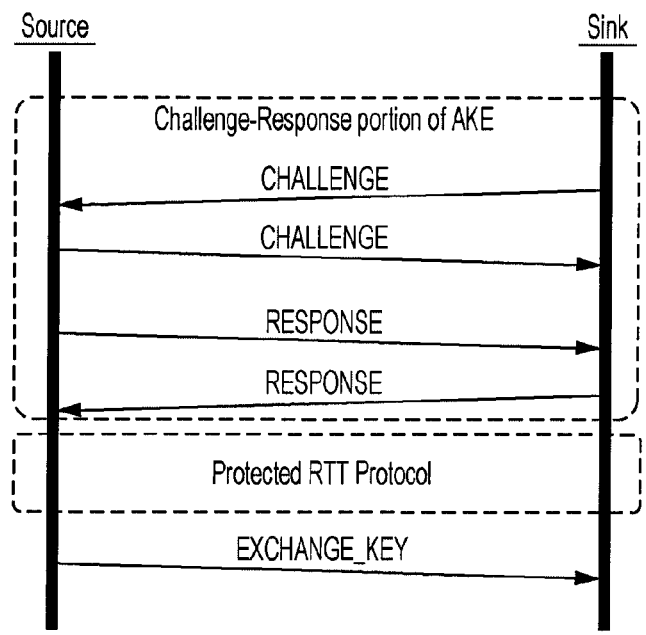
FIG. 6 illustrates a mutual authentication and key exchange operation sequence using an AKE command, which is performed in accordance with the existing DTCP-IP between the source and the sink.

FIG. 6 illustrates an operation sequence (RTT-AKE) of mutual authentication and key exchange using an AKE command, which is performed in accordance with the existing DTCP-IP between the source and the sink.

In the challenge response portion (Challenge-Response portion of AKE) of the AKE procedure, first, an Rx challenge containing an Rx random number and an Rx certificate is transmitted from the sink that requests content. With respect to this, a Tx challenge containing a Tx random number and a Tx certificate is sent back from the source. Hereinafter, an Rx response containing an Rx random number, a Tx message, and a Tx signature is transmitted from the source, and also, a Tx response containing a Tx random number, an Rx message, and an Rx signature is transmitted from the sink. Thus, an ordinary challenge response authentication procedure continues. Each challenge command transmitted using the challenge response portion, each challenge command contains a device ID that is identification information unique to the device.

In the above-described challenge response procedure, a restriction of TTL (hop count of an IP router) is imposed. That is, in the present DTCP-IP, in the transmission device, the TTL is set to 3 or less in the TCP/IP communication that sends a command used in AKE, and it is necessary for the receiving device to invalidate the received data in a case where the TTL is greater than 3.

After that, after undergoing the protected RTT protocol, an EXCHANGE_KEY command is transmitted from the source to the sink, and in response, a response (not shown) is sent back from the sink.

In the RTT-AKE in compliance with the existing DTCP-IP shown in FIG. 6, restrictions on a round trip delay time (RTT) and the hop count (TTL) of an IP router are imposed on the AKE command. If kept in the current state, it is not possible to access content whose copyright has been protected in the server of a home network in a household from a distant place outside the household. When the convenience of a user is considered, a usage is desired in which the user remote-accesses the server of the user's home from the place where the user is staying and reproduces content. Of course, it is necessary to ensure the profit of the content owner who wishes their copyright to be protected. Therefore, the remote access should be limited to within the range of the content permitted by the content owner, and the protection of the content that is remote-accessed should be performed.

In comparison, in the AKE procedure, that is, in the RA-AKE at the time of remote access, which has been proposed in the present invention, the "protected RTT protocol", which is performed in the RTT-AKE procedure shown in FIG. 6, is not performed. That is, even if the RTT between the source and the sink exceeds seven milliseconds, the AKE procedure is not stopped. Furthermore, in the RA-AKE, the upper limit of the TTL is not provided. That is, in the RA-AKE, as a result of not providing restrictions of the RTT and the TTL, the source (content providing device 10) corresponding to remote access, and the sink (content using device 20) corresponding to remote access are separated by such a degree that the response delay time exceeds seven milliseconds or the hop count exceeds 3, it is possible to successfully perform the AKE procedure between the two devices and share the exchange key for remote access.

However, in a communication system in which the restrictions of the RTT and the TTL are lifted, the transmission of content becomes possible between arbitrary devices. Consequently, a scheme for preventing illegal use becomes necessary from the viewpoint of copyright protection of content.

The inventors of the present invention considers that, in order to remove the restrictions of the RTT and the TTL so as to realize remote access of the user within the range permitted by the content owner, it is necessary to identify content for which remote access is permitted and necessary to confirm that the device to be remote-accessed (that is, the content using device 20) is a member of the home network. In the following, a description will be described below in detail of each of a method of identifying remote-accessible content and a method of authenticating a terminal for remote access.

B. Authentication of Terminal for Remote Access

First, a description will be given of a method of confirming that a device to be remote-accessed is a member of an one network.

In order to limit connection from an unauthorized user, an RA-AKE procedure is performed with the RA sink in which an RA source has been registered in advance. Specifically, similarly to the RTT-AKE of the present DTCP-IP, only in a case where an AKE procedure involving RTT and TTL restrictions succeeds, the RA source stores the device unique ID of the RA sink and registers it. The registration procedure of the RA sink is, for example, performed in advance in a household, which falls within the restrictions of the RTT and the TTL. Therefore, since an unauthorized user cannot be pre-registered from a remote environment, the unauthorized user cannot succeed in the RA-AKE procedure.

Figures 7, 8:
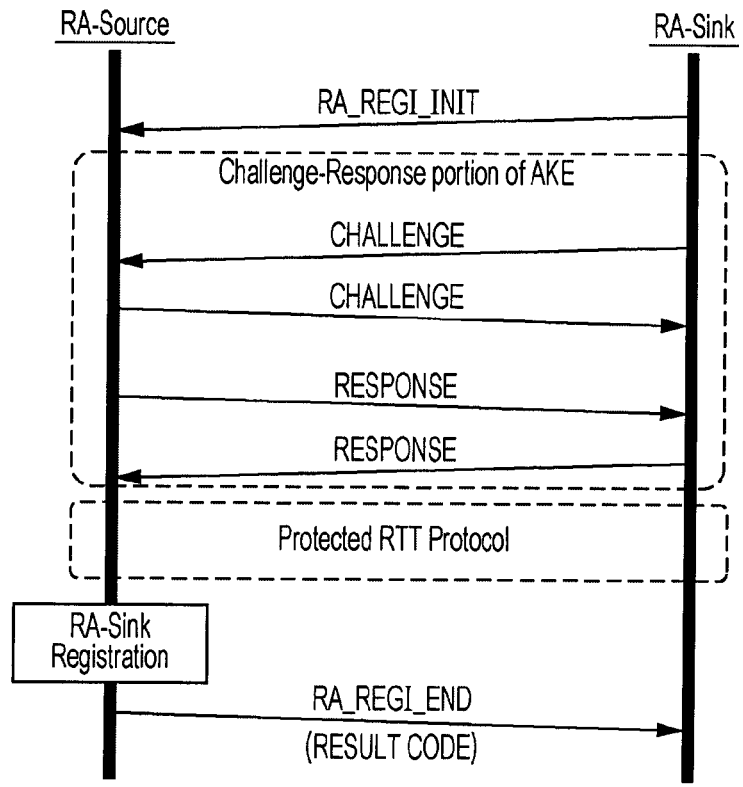
FIG. 7 illustrates an example of an authentication sequence in a case where an RA sink is pre-registered in an RA source.
FIG. 8 illustrates the structure of an AKE control command.

FIG. 7 illustrates an example of an authentication sequence in a case where an RA sink is pre-registered in an RA source.

This authentication sequence starts in response to a registration request command "RA_REGI_INIT" being transmitted to the RA source by the RA sink. In a challenge response portion (challenge-response portion of AKE) of the RA-AKE procedure, first, an Rx challenge containing an Rx random number and an Rx certificate is transmitted from the RA sink. In comparison, a Tx challenge containing a Tx random number and a Tx certificate is sent back from the RA source. Hereinafter, an Rx response containing an Rx random number, a Tx message, and a Tx signature is transmitted from the RA source, and a Tx response containing a Tx random number, an Rx message, and an Rx signature is transmitted from the RA sink.

Each challenge command contains a device ID, which is identification information unique to the device. However, there is a case where, in the same challenge response portion, "RESPONSE2" is sent as a response from the sink to the source. This is a case in which the device contains the common device key and the common device certificate, and thus the device ID does not become unique to the device. In a case where RESPONSE2 is to be sent, IDu that is device unique information contained in the RESPONSE2, rather than the device ID, is used as identification information unique to the device. Meanwhile, a MAC (Media Access Control) address for WiFi, rather than the device ID and IDu, can also be used for the device unique information.

The challenge response portion of the RA-AKE procedure in the registration procedure is subjected to the same process as the RTT-AKE procedure in the existing DTCP-IP, with the restriction of TTL being imposed thereon. After that, the protected RTT protocol further continues, and when the RTT between the RA source and the RA sink exceeds seven milliseconds, the RA-AKE procedure is stopped.

The RA source performs an "RA sink registration" process for registering the RA sink that has succeeded in the procedure up to this point. Then, if the RA registry inside the storage unit 14 has room for registering the ID of the RA sink, the RA source additionally registers it, and notifies the RA sink of the result using a command "RA_REGI_END" as a result code.

Meanwhile, it is assumed that "RA_REGI_INIT" and "RA_REGI_END" in FIG. 7 are added as commands for remote access to the AKE control command of the DTCP-IP. FIG. 8 illustrates an example of the structure of an AKE control command for remote access. In the example shown in the figure, a new value can be assigned to a subfunction field, and information can be conveyed using AKE_Info.

Figure 9:
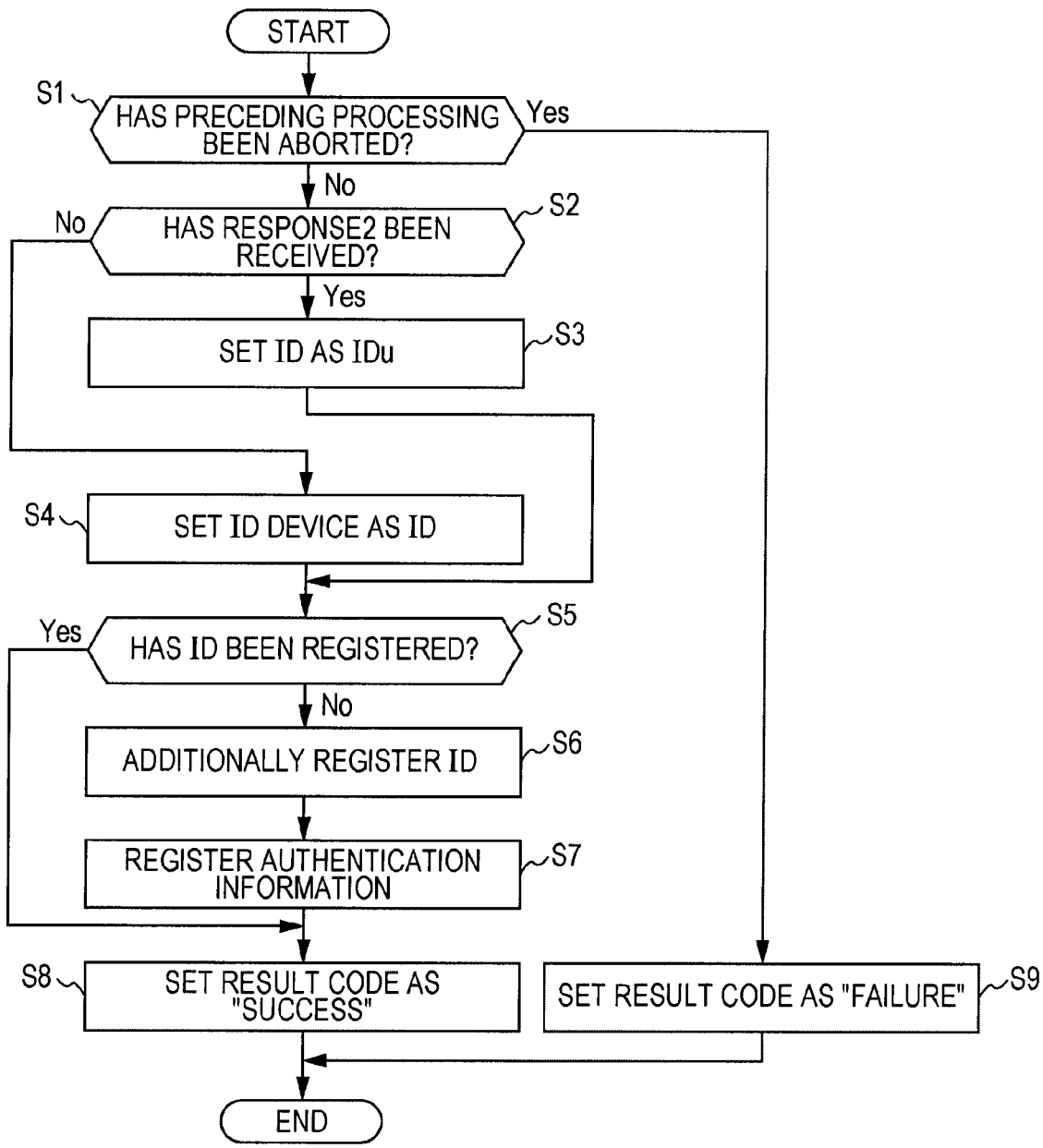
FIG. 9 is a flowchart illustrating the procedure of an "RA sink Registration" process for the RA source to pre-register the RA sink.

FIG. 9 illustrates, in the form of a flowchart, the procedure of the "RA sink registration" process in which the RA source registers the RA sink.

First, the RA source checks whether or not the process (challenge-response portion of AKE and protected RTT protocol) before the relevant process routine is started has aborted (step S1).

Here, in a case where the preceding process has aborted (No in step S1), the RA source notifies the RA sink that is the request source of a result code indicating a "failure" in the registration process (step S9), and the present processing routine is completed.

Furthermore, in a case where the preceding process has been completed normally (Yes in step S1), the RA source checks whether or not RESPONSE2 (above-mentioned) has been received (step S2). Then, when RESPONSE2 has been received (Yes in step S2), the RA source sets the ID of the RA sink that is the request source to IDu (step S3). Furthermore, when RESPONSE2 has not been received (No in step S2), the RA source sets a device ID of the RA sink that is the request source to ID (step S4).

Next, the RA source checks whether or not the ID of the RA sink that is the request source has already been registered (step S5).

Here, in a case where the ID of the RA sink that is the request source has already been registered (Yes in step S5), the RA source notifies the RA sink that is the request source of a result code indicating that the registration process has been "successful" (step S8), and the present processing routine is completed.

On the other hand, when the ID of the RA sink of the request source has not yet been registered (No in step S5), the RA source additionally registers the ID of the relevant RA sink in the storage unit 14 (step S6). Furthermore, as an option, the RA source obtains the authentication information of the user, such as a pass phrase or key, or the bio-information of the user, from the RA sink, and registers the authentication information in such a manner that it is correlated with the ID of the RA sink (step S7). Then, the RA source notifies the RA sink that is the request source of a result code indicating that the registration process has been "successful" (step S8), and ends the present processing routine.

Meanwhile, in the case that information on the RA sink is to be registered in step S6 or step S7, content for the object of remote access in the RA sink among the content that is remote-accessible through the RA source may be registered in combination. In such a case, it is possible for the RA sink to use only the content that has been registered at the time of remote access. The registration of content that is to be remote-accessed resembles a content sharing setting in a home network. By providing such a setting mode, it is possible to prevent the content from being remote-accessed more than necessary. Furthermore, in a case where a great number of content items have been provided from the RA source, it is sufficient that the user registers only the content he/she is interested in for the purpose of remote access.

Figure 10:
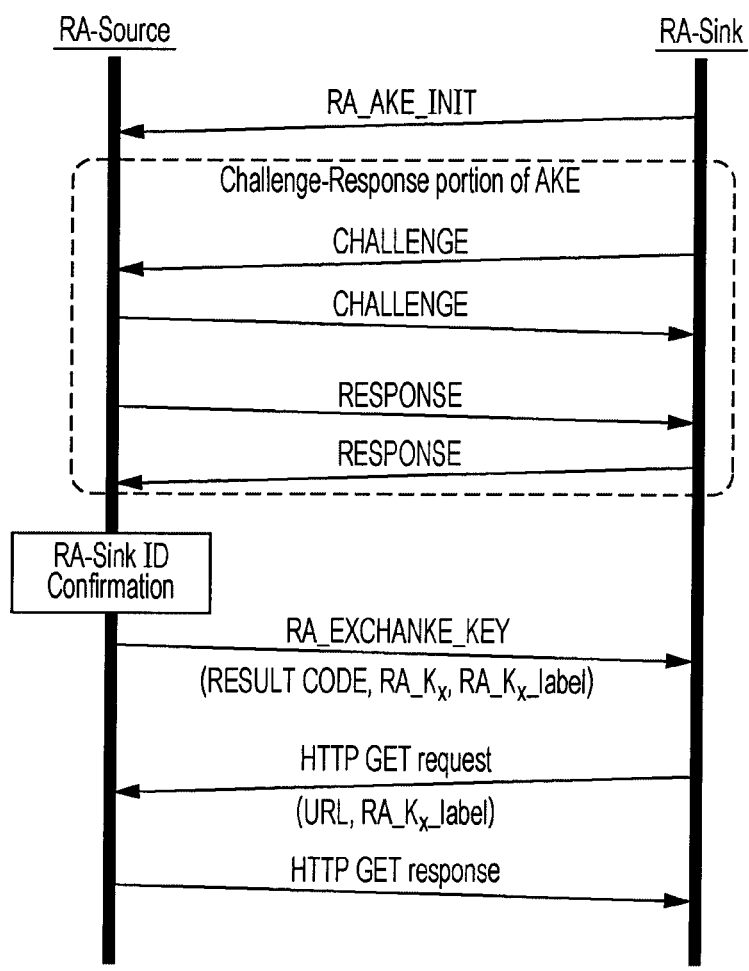
FIG. 10 illustrates an example of a content obtaining sequence in which the RA sink obtains an exchange key for remote access from the RA source in accordance with an RA-AKE procedure, and requests the RA source for content.

FIG. 10 illustrates an example of a content obtaining sequence in which the RA sink obtains an exchange key for remote access from the RA source in accordance with an RA-AKE procedure, and requests the RA source for content.

The content obtaining sequence starts in response to a key supply request command "RA_AKE_INIT" being transmitted to the RA source by the RA sink. In the challenge response portion (challenge-response portion of AKE) of the RA-AKE procedure, first, an Rx challenge containing an Rx random number and an Rx certificate is transmitted from the RA sink. In response, a Tx challenge containing a Tx random number and a Tx certificate is sent back from the RA source. Hereinafter, an Rx response containing an Rx random number, a Tx message, and a Tx signature is transmitted from the RA source, and a Tx response containing a Tx random number, an Rx message, and an Rx signature is transmitted from the RA sink.

Each challenge command contains a device ID that is identification information unique to the device. However, in the same challenge response portion, "RESPONSE2" is sent as a response from the sink. In that case, IDu contained in RESPONSE2 rather than the device ID is used as the identification information unique to the device (same as above).

The restriction of TTL is necessary when registering in the RA source. However, the protocol is omitted in the RA-AKE procedure for supplying an exchange key for remote access. Furthermore, the protected RTT protocol is also omitted in the RA-AKE procedure for supplying the key. As a result, it is possible for the RA sink to request for an exchange key for remote access even in the remote environment, that is, it becomes possible to use content through remote access.

Then, when the RA source succeeds in the authentication procedure, the RA source performs an "RA sink ID confirmation" process. In this process, the RA source confirms that the ID of the RA sink that is the request source has already been registered, and performs an authentication process. Then, in a case where these can be confirmed, the RA source passes an exchange key ($RA\_K_x$) for remote access, the ID ($RA\_K_x$ label) of the relevant exchange key, and the result code to the RA sink by using a command "RA_EXCHANGE_KEY".

When the RA sink obtains the exchange key ($RA\_K_x$) for remote access and the ID ($RA\_K_x$ label) thereof in accordance with the above-mentioned RA-AKE procedure, next, the RA sink requests the RA source for content data in accordance with an HTTP request (HTTP GET request) using an HTTP GET method. At the time of this request, the RA sink sends the ID ($RA\_K_x$ label) of the exchange key for remote access output, together with the URL of the content. Here, a header field for sending the ID ($RA\_K_x$ label) of the exchange key from the RA sink to the RA source is defined.

Upon receiving the request for content data, the RA source calculates an encryption key by using the exchange key for remote access, which is specified using the exchange key ID, encrypts the content of the specified URL by using the encryption key, and sends it back as an HTTP response (HTTP GET response).

Meanwhile, in the case that the RA sink is pre-registered in the RA source, in a case where content for the object of remote access in the RA sink from within the content that is remote-accessible through the RA source has been registered in combination (above-mentioned), it is possible for the RA sink to use only the content through the relevant processing sequence that has been pre-registered.

Furthermore, it is considered that the discarding of ($RA\_K_x$) for remote access is managed under the rule in which, similarly to the DTCP-IP, $RA\_K_x$ is discarded before the continuous unused period exceeds a predetermined period. Furthermore, an operations management scheme is also considered in which a command (RA_FINISH) with which the RA sink demands the discarding of the relevant exchange key when the remote access ends is set together with the ID ($RA\_K_x$ label) of the exchange key. It is assumed that this discarding request command RA_FINISH is added as a command for remote access to the AKE control command of the DTCP-IP, together with "RA-AKE_INIT" and "RA_EXCHANGE_KEY" in FIG. 10.

Figure 11:
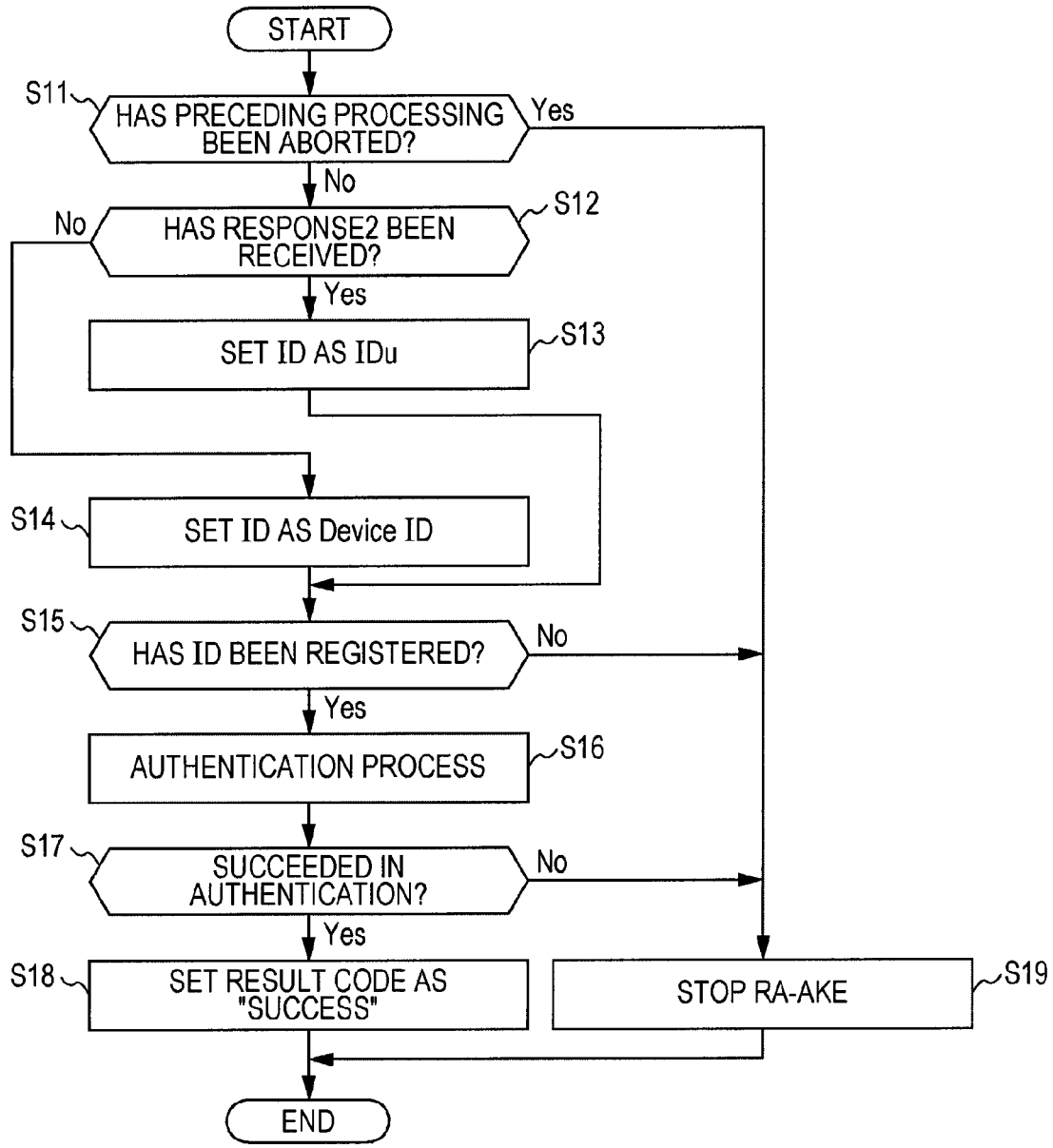
FIG. 11 is a flowchart illustrating the procedure of an "RA sink ID confirmation" process in which the RA source performs registration confirmation and authentication processes of RA sink.
Figure 12:
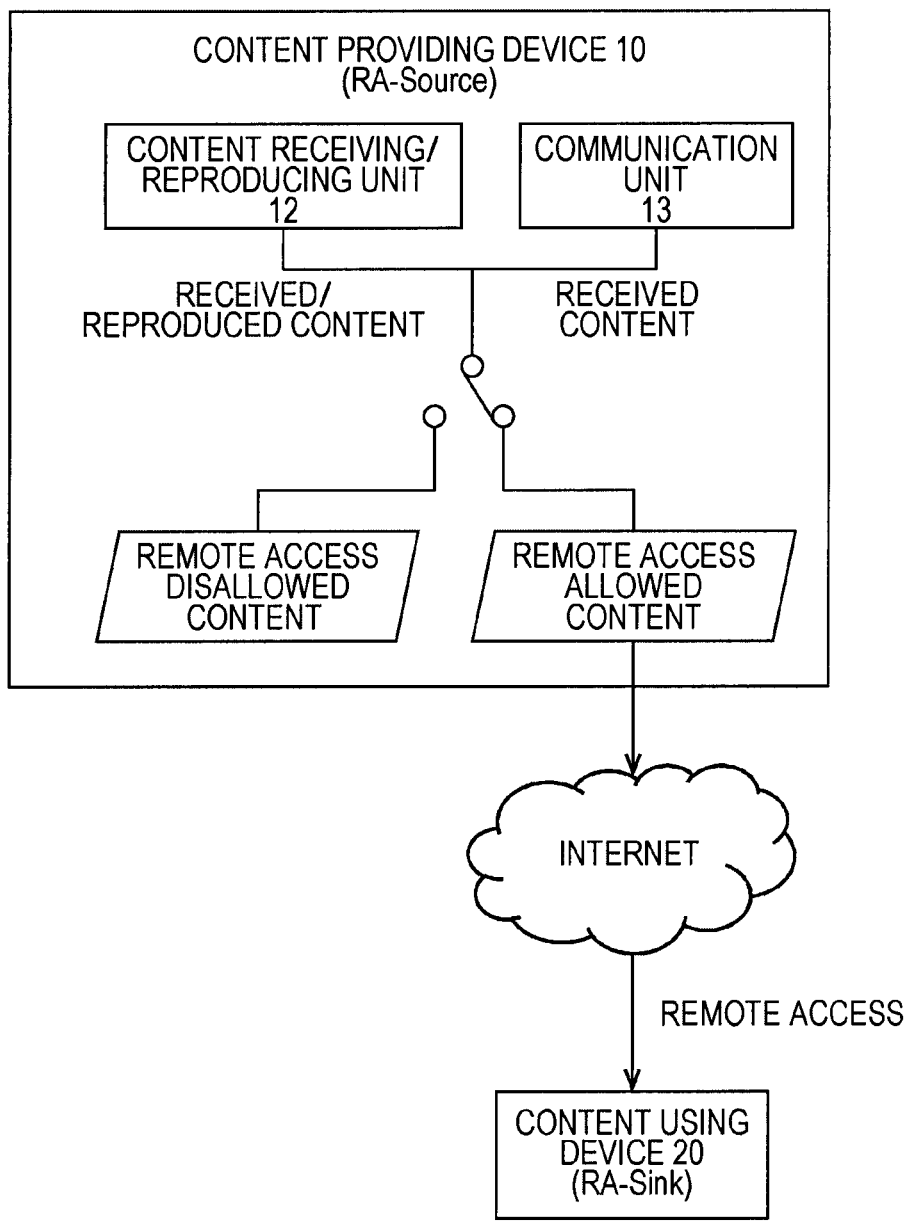
FIG. 12 illustrates a scheme in which a content providing device 10 controls remote access on the basis of remote access allowance/disallowance information appended to the content.

FIG. 11 illustrates, in the form of a flowchart, the procedure of an "RA sink ID confirmation" process in which the RA source performs registration confirmation and authentication processes of RA sink.

First, the RA source checks whether or not the process (challenge-response portion of the AKE, and protected RTT protocol) before the relevant process routine starts has been aborted (step S11).

Here, in a case where the preceding process has been aborted (No in step S11), the RA source stops the RA-AKE procedure with respect to the RA sink that is the request source (step S20), and ends the present processing routine.

Furthermore, in a case where the preceding process has been completed normally (Yes in step S11), the RA source checks whether or not RESPONSE2 has been received (step S12). Then, when RESPONSE2 has been received (Yes in step S12), the RA source sets the ID of the RA sink that is the request source to IDu (step S13). Furthermore, when RESPONSE2 has not been received (No in step S12), the RA source sets the Device ID of the RA sink that is the request source to ID (step S14).

Next, the RA source checks whether or not the ID of the RA sink that is the request source has already been registered in the storage unit 14 (step S15).

Here, when it cannot be confirmed that the ID of the RA sink that is the request source has been registered (No in step S15), the RA source stops the RA-AKE procedure with respect to the RA sink that is the request source (step S19), and ends the present processing routine.

On the other hand, when it can be confirmed that the ID of the RA sink that is the request source has been registered (Yes in step S15), next, the RA source performs a user authentication process for the RA sink (step S16).

Then, when the user authentication process for the RA sink is successful (Yes in step S17), the RA source notifies the RA sink that is the request source of a result code indicating that the confirmation process is "successful" together with the exchange key ($RA\_K_x$) for remote access and the ID ($RA\_K_x$ label) thereof (step S18), and ends the present processing routine.

Furthermore, when the user authentication process for the RA sink is unsuccessful (No in step S17), the RA source stops the RA-AKE procedure with respect to the RA sink that is the request source (step S19), and ends the present processing routine.

In the user authentication process performed in step S16, for example, in a case where a user inputs a user ID for remote access, a pass phrase or key, or the bio-information of the user, or the like from the authentication information input unit 25 of the RA sink, and bio-information with which verification is performed with that registered in the RA source is used for authentication, for example, a biometric authentication system "mofiria" for detecting the vein pattern of a finger can be used. Alternatively, user authentication can also be performed through, instead of an input operation by the user, a method in which a portable medium in which a user ID for remote access, a passphrase, or a key has been written is loaded into the RA sink or a method in which a hardware key, such as a dongle, which is tied to a home network server, is loaded into the RA sink.

As a method of tying a dongle to a home network server, a CPRM (Content Protection for Recordable MEDIA) authentication method for SD memory cards and an Magic Gate authentication method for memory sticks can be used. Alternatively, the content access right of the user can be correlated with the home network server by using a remote-access dedicated authentication method.

Furthermore, in the processing sequence examples shown in FIGS. 7 and 10, it is necessary for the user to perform device setting of pre-registration in a household before the user goes to a distant place. As an example of a method of allowing content remote access without performing the procedure of pre-registration, a method can be given in which an information terminal, such as a personal computer, which is connected to a home network, is used as an authentication server in the home network, and a log-in operation using the log-in ID thereof and a password is used instead for the RA-AKE procedure.

C. Remote-Accessible Content Identification Method

Next, a description will be given of a method for identifying content for which remote access is permitted.

It is presupposed here that information indicating whether or not remote access is allowed has been appended to each content item provided by the RA source.

The content providing device 10 serves as the RA source sorts, on the basis of the remote access allowance/disallowance information, broadcast content received by the content receiving/reproducing unit 12, content reproduced from a recording medium, or content obtained through the communication unit 13. Then, it is possible to remote-access only the content sorted to be remote-accessible from the content using device 20 serving as the RA sink in a remote environment.

Examples of appending remote access allowance/disallowance information to content include a method in which an information bit is superimposed in the control descriptor of content. Alternatively, a method is also considered in which, rather than superimposing an information bit, remote access allowance/disallowance information is used instead with existing information contained in a control descriptor, such as copy control information (CCI).

In the following, a description will be given of a method of appending remote access allowance/disallowance information by taking, as an example, an MPEG2 system that has been widely adopted in transmission and storage of digital content.

The MPEG2 system is such that individual streams, such as coded video and audio, and additional data, are multiplexed, and a method for reproduction while achieving synchronization of respective streams is defined, and the MPEG2 system includes two types: MPEG2-PS (Program Stream) and MPEG2-TS (Transport Stream). The MPEG2-TS among them is assumed to be applied to an environment, such as a broadcast and a communication network, in which a data transmission error occurs, and is used for a digital broadcast because a plurality of programs can be formed in one stream. Furthermore, MPEG2-PS is used for a DVD and the like.

In MPEG2-TS, a plurality of TS (Transport Stream) packets of a fixed length of 188 bytes are grouped to form a transport stream. The TS packet of 188 bytes is determined by considering compatibility with an ATM (Asynchronous Transfer Mode) cell length.

Figure 13:
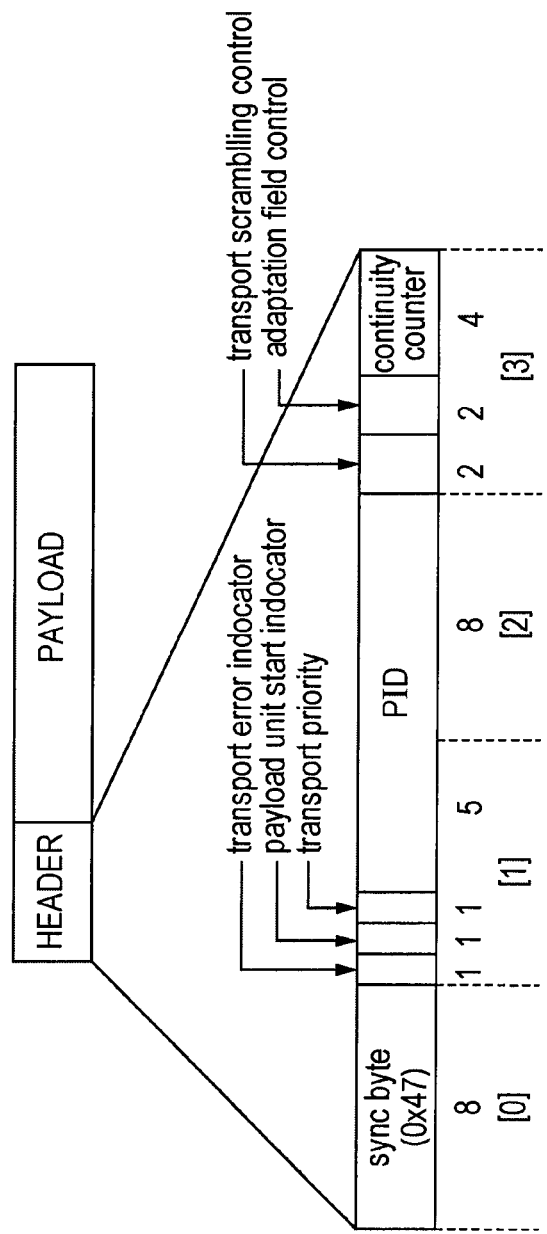
FIG. 13 is an illustration schematically showing the structure of a TS packet.

FIG. 13 schematically shows the structure of a TS packet. One TS packet is formed by a packet header of a fixed length of 4 bytes, an adaptation field of a variable length, and a payload. For the packet header, a PID (packet identifier), and various flags are defined. The PID enables the type of the payload portion of the TS packet to be identified. A PES (Packetized Elementary Stream) packet, in which individual audio streams of video, audio, etc., are contained, is divided into a plurality of TS packets having the same PID number and transmitted.

A transport stream contains a packet in which information written in a table of a section format of PSI (Program Specific Information) and SI (Service Information) is carried in a payload.

PSI is information (control information for station selection) necessary for the system that selects and receives the channel of a desired broadcast, which includes a section having a data structure, such as a PAT (Program Association Table), a PMT (Program Map Table), an NIT (Network Information Table), and a CAT (Condition Access Table). In a PAT, the PID of a PMT corresponding to a program number, etc., are written. In a PMT, video, audio, and additional data contained in the corresponding program, and the PID of a PCR are written. In an NIT, detailed information regarding the whole broadcast system is written. For example, information on all the programs contained in the network, and which carrier wave frequency an intended program is sent at are written. In a CAT, the identification of a conditional reception method, and individual information, such as contract information, are written.

Additionally, an SI is a section used for services of a broadcasting organization. Examples of an SI include sections, such as an EIT (Event Information Table) and an SDT (Service Description Table). In an EIT, detailed information on programs, broadcast times, and the like are written.

In the MPEG2 system, in order to place detailed information in each section, a descriptor is defined, and this is inserted into a section, thereby enabling detailed information to be transmitted. Descriptors used for a terrestrial digital television broadcast, which are defined in the ARIB STD-B10, are listed in the table below.

TABLE 1

| Descriptor Name | Overview of Functions |
| --- | --- |
| Conditional Access Descriptor | Description of conditional reception method, and PID that transmits ECM-EMM thereof |
| Network Name Descriptor | Description of network name |
| Service List Descriptor | Description of organized channel and list of identifications thereof |
| Stuffing Descriptor | Securing of descriptor space, and invalidation of descriptor |
| ServiGe Descriptor | Description of organized channel name and business operator name thereof |
| Linkage Descriptor | Description of other organized channel names and association therewith |
| Short Event Descriptor | Description of program name and brief description of program |
| Extended Event Descriptor | Description of type, explanation, etc. on video component |
| Component Descriptor | Description of identification of individual components |
| Stream Identifier Descriptor | Description of program genre |
| Content Descriptor | Description of difference between actual time and display time for human system at the time of daylight saving time |
| Local Time Offset Descriptor | Description of parameters regarding audio components |

TABLE 1-continued

| Descriptor Name | Overview of Functions |
|---|---|
| Digital Copy Control Descriptor | Description of information for controlling copy generation in digital recording device, and maximum transmission rate |
| Audio Component Descriptor | Description of parameter for audio component |
| Data Content Descriptor | Description of detail information on data content |
| video Decode Control Descriptor | Used to control video code at change of video coding method within same service_id, and to identify whether still image transmission is being performed |
| Download Content Descriptor | Description of attribute information, such as size and type of content to be downloaded, and download ID |

In the ARIB STD-B10, in order to transmit copy control information regarding the copyright protection of content, digital_copy_control_descriptor (digital copy control descriptor) and content_availability_descriptor (content use descriptor) are defined, and these are inserted into the PMT so as to define the copy control information of content. The data structure of the digital copy control descriptor is shown in FIG. 14.

Two bits of digital_recording_control_data (digital recording control data) in the digital copy control descriptor is for copy control (generation management for copy). When these two bits are "00", this indicates copy free; when "11", this indicates copy never; and when "10", this indicates copy one generation. That is, these two bits are used to perform copy control of the CGMS (Copy Generation Management System).

TABLE 2

| Digital Copy Control Information | Description |
|---|---|
| 00 | Copy free without restriction conditions |
| 01 | Defined by business operator |
| 10 | Copy one generation |
| 11 | Copy never |

Figure 15:
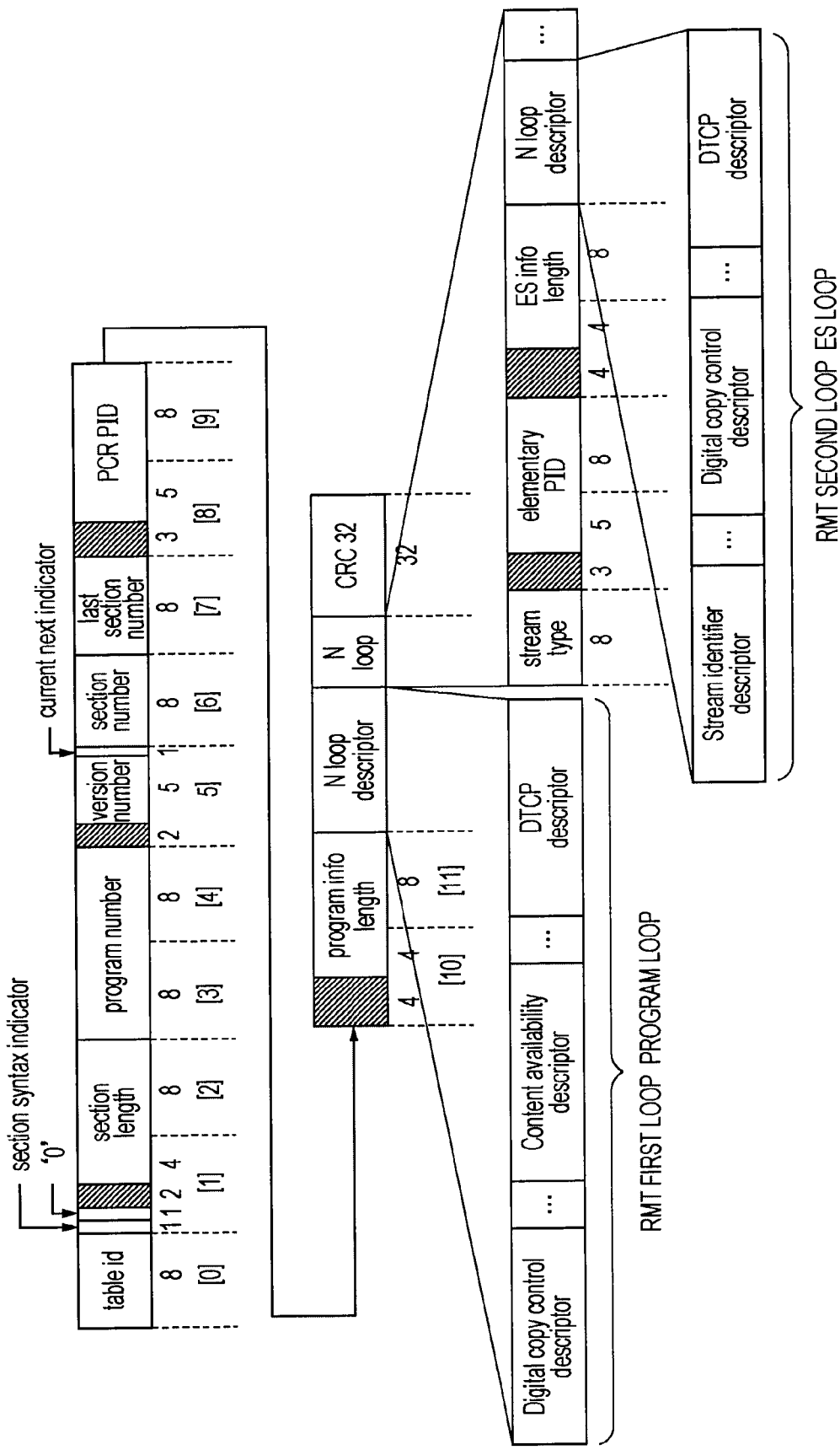
FIG. 15 illustrates a detailed structure of a PMT.

In summary, the copy control information of content is one kind of data contained as a payload of a TS packet forming a stream by which content is transmitted, and has a data structure called a PMT. The detailed structure of a PMT is shown in FIG. 15.

An MPEG TS stream is formed by a repetition of a TS packet of a fixed length such as that described above. Copy control information is not contained in all the TS packets, and is contained only in a specific TS packet. For example, it is determined in the ARIB that a packet by which a PMT having copy control information written is transmitted at intervals of 100 milliseconds is contained in an MPEG TS stream. FIG. 16 illustrates a state in which a TS packet containing a PMT has been inserted in an MPEG TS stream at predetermined intervals. According to the configuration shown in the figure, on the content supply device side, it is possible to specify content attributes, such as copy control information regarding content protection in a transmission stream. Then, on the content processing device side that receives content, it is possible to perform setting of an encryption mode of content, and restriction of copy and recording in accordance with the copy control information.

Whether or not remote access of content is allowed is deeply related to the copyright protection of content. Accordingly, the inventors of the present invention have proposed a method of using a digital control descriptor in order to identify content for which remote access is allowed.

As one method, a reserved area (reserved_future_use) in the digital control descriptor shown in FIG. 14 is defined in a flag (hereinafter referred to as an "RA flag") indicating the allowance/disallowance of remote access, wherein this indicates remote access allowed when RA=1 and remote access disallowed when RA=0.

Furthermore, as another method, copy control information (CCI) contained in the digital copy control descriptor shown in FIG. 14 is also used in combination as a control descriptor for remote access. For example, copy disallowed (Never Copy) content is set to be remote access disallowed, copy allowed (Copy Free) content without control conditions and copy one generation content are set to be remote-access allowed.

TABLE 3

| Digital Copy Control Information | Description | RA Allowance/ Disallowance |
|---|---|---|
| 00 | Copy free without restriction conditions | RA allowed |
| 10 | Copy one generation | |
| 11 | Copy never | RA disallowed |

The above-mentioned identification method can be mainly applied to broadcast content. Of course, regarding recording media, such as a Blu-ray, a DVD (Digital Versatile Disc), and a flash memory, and content distributed through the Internet, an identical identification method can be realized by using digital copy control descriptors that are defined in an AACS (Advanced Access Content System), a CSS (Content Scramble System), a CPRM, and the like, which are .copyright protection technologies for recording media.

In the case of remote access of a Blu-ray disc, the content is controlled by the AACS, which is the copyright protection technology thereof, and after the content is copied to the storage unit 14 (HDD or the like) in the content providing device 10, the content is passed to the DTCP-IP so as to be used for remote access.

A "remote access control file" for controlling remote access of content is written in an XML (extensible Markup Language) language. The remote access control file is constituted by a "Managed Copy and Remote Access Manifest File" targeting the main part of a Blu-ray disc, and a "Remote Access Manifest File" targeting a portable file. These files are read into a JAVA (registered trademark) virtual machine MCRAM (Managed Copy and Remote Access Machine) or a RAM (Remote Access Machine), and are executed.

An example of a case in which a portable file for remote access is assumed to be stored in a directory "PARTIALDB" on a Blu-ray disc, is assumed to be copied to a directory in the HDD that is specified by a destination, and is assumed to be used for remote access is shown below.

[Math. 1]

```
<?xml version="1.0" encoding="UTF-8"?>
<ramfManifest xmlns="http://www.aacsla.com/2009/09/bdraManifest"
  contentID="0x00000000000000000000123456789">
    <URIList>
      <URI>http://example.com/RemoteAccess/00000001/</URI>
      <URI>http://example.net/RemoteAccess/00000001/</URI>
    </URIList>
```

[Math. 1]

```
<RAUALL>
    <DirectoryName>BDMV</DirectoryName>
</RAUALL>
<RAUPARTIAL ID="0x0001">
    <FileName>BDMV/PLAYLIST/00000.mpls</FileName>
    <FileName>BDMV/CLIPINF/00000.clpi</FileName>
    <FileName>BDMV/STREAM/00000.m2ts</FileName>
    <FileName>BDMV/BDJO/00000.bdjo</FileName>
    <FileName>BDMV/JAR/00000.jar</FileName>
    <FileName dest="BDMV/index.bdmv">
        PARTIALDB/index.bdmv</FileName>
        <FileName dest="BDMV/MovieObject.bdmv">
        PARTIALDB/MovieObject.bdmv</FileName>
    <description lang="jpn" text="Japanese" />
</RAUPARTIAL>
</ramfManifest>
```

Figure 17:
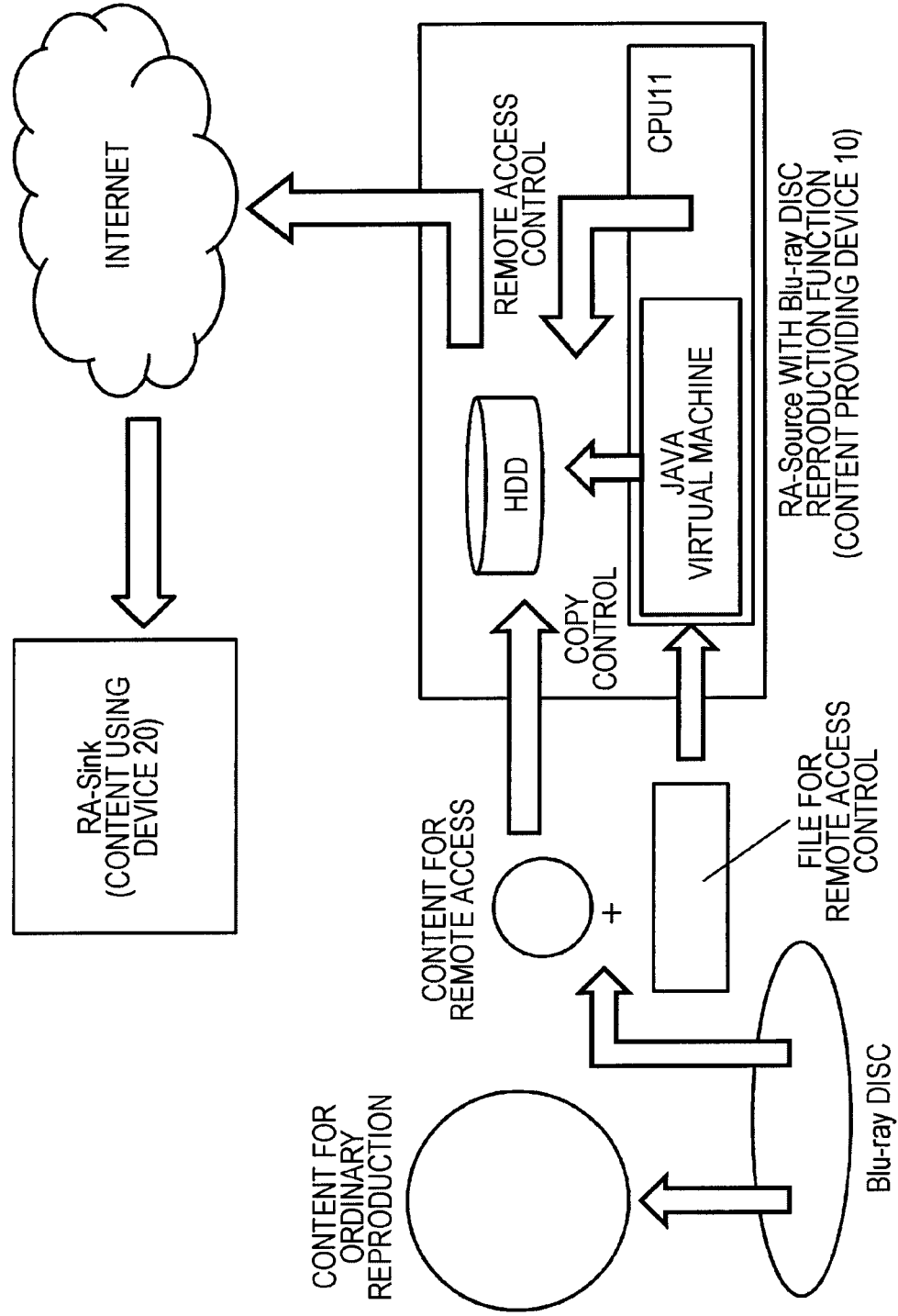
FIG. 17 illustrates a scheme for controlling remote access of content on a Blu-ray disc.

FIG. 17 illustrates a scheme for controlling remote access of content on a Blu-ray disc. The content providing device 10 serving as the RA source reads a JAVA (registered trademark) application from a Blu-ray disc by the content receiving/reproducing unit 12, loads the JAVA application into the system memory of the CPU 11, operates a JAVA (registered trademark) virtual machine, and performs the control of remote access to content for remote access, which is read from the Blu-ray disc.

Up to this point, a description has been given of a method in which allowance/disallowance of remote access is identified on the basis of the information, such as copyright protection accompanied by content. In addition to this method, a method of identifying allowance/disallowance of remote access on the basis of the state of content is also considered.

For example, content that is stored with constraint regarding copy control being lifted in the storage unit 14 (HDD, etc.) of the content providing device 10 that operates as a home network server is all copied products, in other words, content for which copy is allowed. Consequently, the content can be handled as being remote access allowed in accordance with Table 3 above.

However, in a case where broadcast content is received by the content receiving/reproducing unit 12 and is recorded in the storage unit 14, it is preferable that restriction be imposed on remote access of real time content that is being broadcast by considering a business model of a broadcast of broadcast area restriction or the like. Specifically, the broadcast content is temporarily stored in the storage unit 14, and remote access is allowed after a fixed time has elapsed. For example, the remote access of content is allowed with a delay of 30 minutes from the broadcast, or remote access is allowed in the case that the broadcast has ended. Alternatively, it is possible to set a time-related restriction, such as after 6 hours, after 12 hours, tomorrow or later, after one week, or later, after the broadcast ends.

Furthermore, rather than singly using one of a method of identifying allowance/disallowance of remote access on the basis of the information on copyright protection accompanied by content and a method of identifying allowance/disallowance of remote access on the basis of the state of content, a method of identifying allowance/disallowance of remote access of content stored in the content providing device 10 by combining these two methods is also considered. In addition to the copy control information appended to the content stored in the storage unit 14, an RA flag indicating allowance/disallowance of remote access is additionally defined, so that when RA=1, remote access is set to be allowed, and when RA=0, remote access is set to be disallowed. When remote access to content is requested from the content using device 20, the content providing device 10 controls the remote access by using in reference the RA flag of the requested content.

Furthermore, rather than additionally defining the RA flag, the content providing device 10 may provide dedicated file folders (or partitions) for storing content for which remote access has been allowed and content for which remote access has been disallowed in the storage unit 14 correspondingly, may make a determination as to the allowance/disallowance of remote access when, for example, the content is obtained, and may sort the content into each file folder. In such a case, whereas the content using device 20 can freely remote-access the content stored in the file folder for remote-access allowed content, the content using device 20 cannot freely remote-access the content stored in the file folder for remote-access disallowed content.

D. Remote Access Identification Method

The content providing device 10, such as a home network server, which operates as the RA source, can identify whether or not the content using device 20 that performs remote access is the RA sink for which remote access has been allowed, and whether or not content for which the content using device 20 requests remote access has been allowed for remote access in accordance with the method that has been described thus far.

However, the content providing device 10, to begin with, needs to accurately identify whether or not access from the content using device 20 is remote access. The reason for this is that the use of content by the content using device 20 in the normal home network of the DTCP-IP is an authorized use even from the viewpoint of copyright protection, and if access is rejected, the profit of the user is unduly impaired.

In the following, a description will be given of a method of identifying which one of an ordinary authentication procedure in the home network of the DTCP-IP, and an authentication procedure (RA-AKE) performed by the remote access from a distant place the AKE procedure (RTT-AKE) that is requested from the content using device 20 is.

The structure of an AKE control command is shown in FIG. 8. In the ordinary AKE control command of the DTCP-IP, the high-order 4 bits of Control(0) are reserved (ZERO). For example, if the field of a 4-bit length is set to all 1 and is defined as an authentication mode for remote access, a distinction can be made from the AKE procedure in the ordinary home network of the normal DTCP-IP. The subsequent AKE procedure becomes an AKE procedure (RA-AKE) differing from the AKE procedure (RTT-AKE) in the ordinary home network of the DTCP-IP. Furthermore, a distinction can be made also by defining an AKE control command for remote access by using a value that is not defined currently as the subfunction of Control(2).

Alternatively, rather than providing a control bit as to whether or not indicating remote access in the AKE control command in the manner described above, an authentication procedure dedicated to remote access may be newly defined. In the AKE_procedure that is assigned to Control(3) of the ordinary AKE control command of the DTCP-IP, under the current situation, the 4-th bit (bit 3) from the low order is used to performs the normal AKE procedure with full authentication, and is defined in the flag for identifying whether or not the AKE procedure is performed with extended fulle authentication. Furthermore, the high order 4 bits are used as a reserved area for future extension. Therefore, it is also considered that full authentication for remote access is newly defined in the reserved area of the high-order 4 bits, and the AKE procedure is performed.

TABLE 4

| Bit | AKE_procedure |
| --- | --- |
| 0(lsb) | Restricted Authentication procedure |
| 1 | Enhanced Restricted Authentication procedure |
| 2 | Full Authentication procedure |
| 3 | Extended Full Authentication procedure |
| 4-7(msb) | Reserved for future extention and shall be zero |

In the manner described above, if the AKE procedure (RA-AKE) for remote access holds, an exchange key for remote access is shared between the content providing device 10 serving as the RA source and the content using device 20 serving as the RA sink. Then, content transmission may be performed by using the encryption mode that has been newly provided for remote access.

In the DTCP-IP, transmission of copy control information accompanied by content is realized by two mechanisms of E-EMI (Extended Encryption Mode Indicator) and EmbeddedCCI (Copy Control Information) written in the header part of a packet. Table 5 below shows a list of encryption modes (EMI) of the existing DTCP-IP.

TABLE 5

| E-EMI Mode | E-EMI Value | Description |
| --- | --- | --- |
| Mode A0 | $1100_2$ | Copy-never (CN) |
| Mode B1 | $1010_2$ | Copy-one-generation (COG)[Format-cognizant recording only] |
| Mode B0 | $1000_2$ | Copy-one-generation (COG)[Format-non cognizant recording permitted] |
| Mode C1 | $0110_2$ | Move [Audiovisual] |
| Mode C0 | $0100_2$ | No-more-copies (NMC) |
| Mode D0 | $0010_2$ | Copy-free with EPN asserted (CF/EPN) |
| N.A | $0000_2$ | Copy-free (CF) |
|  | $\ldots_2$ | All other values reserved |

Since remote access is connected through an external network, the content protection level requires that an encryption mode at a level differing from that used in a normal network in a household be used. For example, in addition to copy never (CN) and copy for one generation (COG) in a household, encryption modes such as copy never in remote access (RA-CN), and copy free for one generation (RA-COG) are necessary. Then, by using the reserved values of Table 5 above, these new encryption modes for remote access are defined.

In the description up to this point, it is supposed that the communication system is constituted by only a pair of a RA source and a RA sink. However, there is a probability that each of the RA source and the RA sink is further connected in a daisy-chain format to another device, and content is transmitted. The transmission range of the content for which copyright is protected should originally be limited to within a household. It is undesirable that the reception and the retransmission of content is repeated for many times. For this reason, it is necessary to technically block the reception and the retransmission of content.

In the present embodiment, an RA flag indicating allowance/disallowance of remote access of content has been appended to each content item (described above), and the retransmission of content is limited by using this flag.

For example, in a certain device, it can be seen that in a case where an RA flag of content stored in the content providing device 10 serving as the RA source indicates "remote access allowed", the content has already been transferred (that is, received as the RA sink), and retransmission should be stopped.

Alternatively, when the content providing device 10 temporarily caches the content received as the RA sink, stores the content in the storage unit 14, or retransmits the content without recording it at all, the content providing device 10 rewrites the RA flag appended to the reception content to "remote access disallowed" so as to prevent retransmission through remote access.

Figure 18:
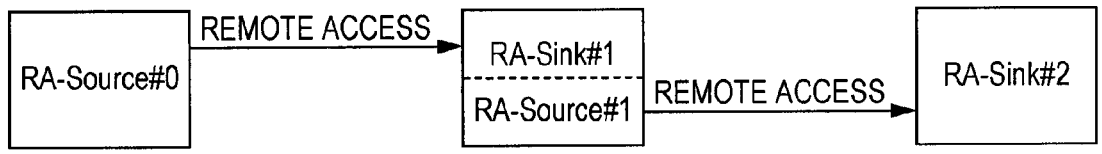
FIG. 18 is an illustration schematically showing an example of a system configuration in which the RA source and the RA sink are daisy-chain-connected to still another device, and the received content may be further output.

In the example of the system configuration shown in FIG. 18, an RA sink#1 connected to an RA source#0 further includes a function as an RA source#1 and is connected to another device RA sink#2. In such a case, operations management is carried out in such a way that by prohibiting the content received by remote access as the RA sink#1 from being remote-accessed and output again to the RA sink#2 serving as the RA source#1, the content is prevented from being remote-accessed in a place where the management of the RA source#0 that is the content providing source is not exercised.

Figure 19:
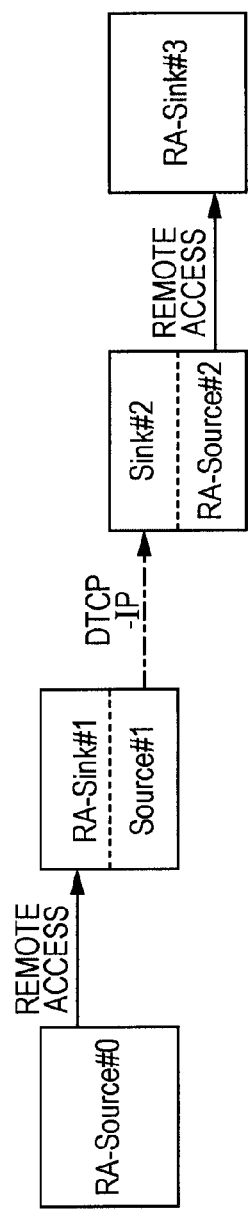
FIG. 19 is an illustration schematically showing an example of a system configuration in which the RA source and the RA sink are daisy-chain-connected to still another device, and the received content may be further output.

Furthermore, in the example of the system configuration shown in FIG. 19, the RA sink#1 is connected to the RA source#0 through remote access, includes a function as the source#1, and is connected to another device sink#2 in accordance with the DTCP-IP. In addition, the sink#2 also includes a function as an RA source#2 and is connected to another device RA sink#3. It is possible for the RA sink#1 to locally transmit the content received through remote access to another device sink#2 through the DTCP-IP. Local transmission through the DTCP-IP is adhered to the scheme for copyright protection, and no problem is posed.

Furthermore, operations management is carried out in such a way that by prohibiting the content received by the sink#2 from being remote-accessed and output again to the RA sink#3 as the RA source#2, the content is prevented from being remote-accessed in a place where the management of the RA source#0 that is the content providing source is not exercised.

As has already been described, the RA flag is defined to be remote access allowed when RA=1, and to be remote access disallowed when RA=0. Here, in the existing DTCP-IP, since the RA flag has not been defined, in a case where the allowance/disallowance of remote access is to be controlled by using the RA flag, compatibility with a conventional DTCP-IP device becomes a problem.

For example, a control bit for indicating the allowance/disallowance of remote access, and an AKE procedure for remote access are not newly provided in the DTCP-IP, and content received by each device through the DTCP-IP is all handled as being remote access disallowed. As a result, content (allowance/disallowance of remote access is unclear) that is received through a DTCP-IP device is made to be remote-access disallowed while maintaining the compatibility with a conventional DTCP-IP device.

TABLE 6

|  | RA flag | Way of handling content |
| --- | --- | --- |
| None | NA | Remote access disallowed |
| Exist | RA = 0 | Remote access disallowed |
|  | RA = 1 | Remote access allowed |

Alternatively, instead of making the content received through the DTCP-IP in the manner described above to be remote access disallowed, by using copy control information (CCI) in combination also as a control descriptor for remote access, it is possible to maintain the compatibility with a conventional DTCP-IP device.

Specifically, as shown in second and third rows of Table 7 below, by handling only the content such that no more copy or never copy has been encoded as being remote access disallowed, content (allowance/disallowance of remote access is unclear) that is received through a conventional DTCP-IP device is made to be remote access disallowed while maintaining the compatibility with a conventional DTCP-IP device.

Furthermore, as shown in the fourth and fifth rows of Table 7 below, after the content that is not made to be remote access disallowed is temporarily stored in the storage unit 14, the content is handled as being remote access allowed, and is handled as being remote access disallowed in a state before the content is stored.

TABLE 7

| RA flag | CCI | Way of handling content |
|---|---|---|
| None NA | Copy Never, No more copy | Remote access disallowed |
| NA | Copy Free, Copy one generation, EPN, other recordable state | Remote access allowed |
| Exist RA = 0 | Don't care | Remote access disallowed |
| RA = 1 | Don't care | Remote access allowed |

According to the communication system in accordance with the present embodiment, it is possible to remote access DLNA content for which copyright is protected by the DTCP-IP from a distant place outside a household and securely use the content.

Furthermore, in the communication system according to the present embodiment, a way of handling a flag for controlling remote access of content, and an authentication method (AKE procedure) at the time of remote access are defined explicitly. Consequently, also in remote access, similarly to conventional access in a household, it is possible to construct a copyright protection environment for content, which is based on the DTCP-IP.

INDUSTRIAL APPLICABILITY

The present invention has been described above in detail while referring to specific embodiments. However, it is obvious that a person skilled in the art can make modifications and substitutions of the embodiments within the spirit and scope of the present invention.

Examples of applications of the present invention include a communication system that remote accesses a server in a home network in which the DTCP-IP is applied from a client outside a household and uses content. However, the gist of the present invention is not limited to this. The present invention can be similarly applied to all other content transmission systems that transmit content through remote access via an external network, such as a WAN, the content requiring protection for the purpose of copyright and other reasons, while exceeding restrictions of a round trip delay time (RTT) and the hop count (TTL) of an IP router.

In summary, the present invention has been disclosed as exemplary embodiments, and should not be construed as being limited. In order to determine the gist of the present invention, the claims should be taken into consideration.

REFERENCE SIGNS LIST

10 . . . content providing device (RA-source)
11 . . . CPU
12 . . . content receiving/reproducing unit
13 . . . communication unit
14 . . . storage unit
15 . . . timer
20 . . . content using device (RA-sink)
21 . . . CPU
22 . . . communication unit
23 . . . content output unit
24 . . . storage unit
25 . . . authentication information input unit
30, 31 . . . router
40, 41 . . . modem
50 . . . WAN
60 . . . IAS service
70 . . . DDNS service

The invention claimed is:

1. A communication system that performs communication for transmitting content between a content providing device and one or more content using devices, the communication system comprising circuitry configured to:
   register in advance, by the content providing device, a content using device after undergoing a registration mutual authentication procedure with the content using device in which a time restriction for a round trip time of a first command is imposed and a hop count restriction of an Internet Protocol (IP) router is imposed, wherein the registering further comprises registering bio-information of a user for remote access;
   perform a remote access mutual authentication procedure between the content providing device and the registered content using device in which the time restriction on the round trip time of a second command is not imposed and the hop count restriction of the IP router is not imposed, thus allowing a requested content to be remotely accessed by the registered content using device from any location; and
   provide the requested content to the authenticated content using device that requests the content through remote access in response to authenticating the content using device registered in advance.

2. The communication system of claim 1, wherein the time restriction is seven milliseconds.

3. A communication apparatus for providing content comprising circuitry configured to:
   register in advance, by the circuitry, a content using device after undergoing a registration mutual authentication procedure with the content using device in which a time restriction for a round trip time of a first command is imposed and a hop count restriction of an Internet Protocol (IP) router is imposed, wherein the registering further comprises registering bio-information of a user for remote access;
   perform a remote access mutual authentication procedure with the registered content using device in which the time restriction on the round trip time of a second command is not imposed and the hop count restriction of the IP router is not imposed, thus allowing a requested content to be remotely accessed by the registered content using device from any location; and
   provide the requested content to the content using device, wherein the circuitry provides the requested content to the content using device that requests the content through remote access in response to authenticating the content using device registered in advance.

4. The communication apparatus according to claim 3, wherein the circuitry is configured to identify whether or not remote access has been allowed on the basis of information indicating allowance/disallowance of remote access, the information being superimposed in a predetermined control descriptor of the requested content.

5. The communication apparatus according to claim 3, wherein the circuitry is configured to identify whether or not remote access has been allowed on the basis of described content of a predetermined control descriptor of the requested content.

6. The communication apparatus according to claim 3, wherein the circuitry is configured to identify whether or not remote access has been allowed on the basis of described content of copy control information.

7. The communication apparatus according to claim 3, further comprising a storage that can store content, wherein the circuitry is configured to identify that content in the storage has been allowed for remote access.

8. The communication apparatus according to claim 3, wherein the circuitry is configured to:
receive broadcast content, and
identify whether or not real time content that is being broadcast has been allowed for delayed remote access on the basis of an elapsed time after the completion of the broadcast.

9. The communication apparatus according to claim 3, further comprising a storage that stores content, wherein the circuitry is configured to:
receive broadcast content,
store the received broadcast content in the storage and, after storing is complete, identify that the content has been allowed for remote access.

10. The communication apparatus according to claim 3, further comprising a storage having a first area for storing remote-access allowed content and a second area for storing remote-access disallowed content,
wherein content items are sorted into the first or second area on the basis of authenticating the content using device registered in advance.

11. The communication apparatus according to claim 3, wherein authenticating the content using device registered in advance further comprises using a portable medium on which authentication information for remote access has been written.

12. The communication apparatus according to claim 3, wherein authenticating the content using device registered in advance further comprises authenticating the content using device that performs remote access through a dongle tied to another device.

13. The communication apparatus according to claim 3, wherein registering further comprises registering one or more content items that are used by a second content using device at the time of remote access, and
wherein providing the requested content comprises providing only pre-registered content.

14. The communication apparatus according to claim 3, wherein authenticating the content using device registered in advance further comprises authenticating the content using device that performs remote access through a log-in process for a predetermined authentication server.

15. The communication apparatus according to claim 3, wherein authenticating the content using device registered in advance further comprises authenticating the content using device that performs remote access on the basis of an information bit indicating allowance/disallowance of remote access, the information bit being provided in a mutual authentication control command from the content using device.

16. The communication apparatus according to claim 3, wherein authenticating the content using device registered in advance further comprises authenticating the content using device that performs remote access in accordance with a mutual authentication procedure dedicated to remote access.

17. The communication apparatus according to claim 15 or 16, wherein providing further comprises encrypting and transmitting content requested through remote access from the content using device by using an encryption mode dedicated to remote access.

18. The communication apparatus according to claim 15 or 16, wherein providing further comprises providing content while prohibiting output of content through remote access.

19. The communication apparatus according to claim 15 or 16, further comprising a storage that stores content, wherein when information indicating that remote access is allowed has been appended to content stored in the storage, output through remote access is prohibited.

20. The communication apparatus according to claim 15 or 16, further comprising a storage that stores content, wherein when content to which information indicating that remote access is possible has been appended is to be stored in the storage, information to remote access disallowed is rewritten.

21. The communication apparatus according to claim 15 or 16, wherein when information indicating allowance/disallowance of remote access has not been appended to content received in accordance with a predetermined protocol, on which copyright protection has been performed, the circuitry is configured to handle the content as being remote access disallowed.

22. The communication apparatus according to claim 15, wherein when information indicating allowance/disallowance of remote access has not been appended to content received in accordance with a predetermined protocol, on which copyright protection has been performed, the circuitry is configured to identify whether or not the content has been allowed for remote access on the basis of copy control information that is set in the content.

23. The communication apparatus according to claim 22, further comprising a storage that stores content, wherein the circuitry is configured to:
temporarily store content that is not made to be disallowed for remote access in the storage and thereafter handle the content as being remote access allowed, and
handle the content as being disallowed for remote access in a state before the content is stored in the storage.

24. The communication apparatus of claim 3, wherein the time restriction is seven milliseconds.

25. A communication method comprising:
registering in advance, by a content providing device, a content using device after undergoing a registration mutual authentication procedure with the content using device in which a time restriction for a round trip time of a first command is imposed and a hop count restriction of an Internet Protocol (IP) router is imposed, wherein the registering further comprises registering bio-information of a user for remote access;
performing a remote access mutual authentication procedure between the content providing device and the registered content using device in which the time restriction on the round trip time of a second command is not imposed and the hop count restriction of the IP router is not imposed, thus allowing a requested content to be remotely accessed by the registered content using device from any location; and providing the requested content to the content using device, wherein in the providing step, the requested content is provided to the content using device that requests the content through remote access in response to authenticating the content using device.

26. The communication method of claim 25, wherein the time restriction is seven milliseconds.

27. A computer program, stored on a non-transitory computer readable medium and written in a computer-readable format so that a process for providing content via a network is performed in a computer, causing the computer to perform the steps of:

registering in advance, by a content providing device, a content using device after undergoing a registration mutual authentication procedure with the content using device in which a time restriction for a round trip time of a first command is imposed and a hop count restriction of an Internet Protocol (IP) router is imposed, wherein the registering further comprises registering bio-information of a user for remote access;

performing a remote access mutual authentication procedure between the content providing device and the registered content using device in which the time restriction on the round trip time of a second command is not imposed and the hop count restriction of the IP router is not imposed, thus allowing a requested content to be remotely accessed by the registered content using device from any location; and providing the requested content to the content using device, wherein providing further comprises providing the requested content to the content using device that requests the content through remote access in response to authenticating the content using device.

28. The computer program of claim 27, wherein the time restriction is seven milliseconds.

* * * * *